US012634064B2

(12) United States Patent
Patchava et al.

(10) Patent No.: US 12,634,064 B2
(45) Date of Patent: May 19, 2026

(54) CHANNEL STATE INFORMATION REFERENCE SIGNALS IN ORTHOGONAL TIME FREQUENCY SPACE

(71) Applicant: QUALCOMM Incorporated, San Diego, CA (US)

(72) Inventors: Raviteja Patchava, San Diego, CA (US); Jing Sun, San Diego, CA (US); Xiaoxia Zhang, San Diego, CA (US); Zhifei Fan, San Diego, CA (US); Morteza Soltani, San Diego, CA (US); Jun Ma, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 17/813,665

(22) Filed: Jul. 20, 2022

(65) Prior Publication Data
US 2024/0031089 A1 Jan. 25, 2024

(51) Int. Cl.
*H04L 5/00* (2006.01)
*H04L 27/26* (2006.01)
*H04W 72/044* (2023.01)

(52) U.S. Cl.
CPC .......... *H04L 5/0048* (2013.01); *H04L 5/0023* (2013.01); *H04L 27/2639* (2013.01); *H04W 72/044* (2013.01)

(58) Field of Classification Search
None
See application file for complete search history.

(56) References Cited

U.S. PATENT DOCUMENTS

2020/0389255 A1* 12/2020 Harrison ................... H04L 1/08
2020/0389268 A1* 12/2020 Sathyanarayan ...... H01Q 21/28
2022/0385509 A1* 12/2022 Ibars Casas .......... H04L 5/0023

FOREIGN PATENT DOCUMENTS

WO 2020263406 A1 12/2020
WO 2021134600 A1 7/2021

OTHER PUBLICATIONS

International Search Report and Written Opinion—PCT/US2023/068983—ISA/EPO—Oct. 10, 2023.

* cited by examiner

*Primary Examiner* — Jutai Kao
(74) *Attorney, Agent, or Firm* — Harrity & Harrity, LLP

(57) ABSTRACT
Various aspects of the present disclosure generally relate to wireless communication. In some aspects, a mobile station may receive, based at least in part on a time-frequency domain resource block that is characterized at least by a frequency span and a time duration, a wireless signal that comprises: a first modulated portion located in a first partition of the time-frequency domain resource block, the first modulated portion being based at least in part on an orthogonal time frequency space (OTFS) modulation scheme, and a second modulated portion located in a second partition of the time-frequency domain resource block, the second modulated portion being based at least in part on a second modulation scheme. The mobile station may recover a channel state information reference signal (CSI-RS) from the first modulated portion or the second modulated portion. Numerous other aspects are described.

26 Claims, 14 Drawing Sheets

OTFS Modulated Signal Diagram 302

Channel Response Diagram 308

Output Signal Diagram 310

Figure 4B:
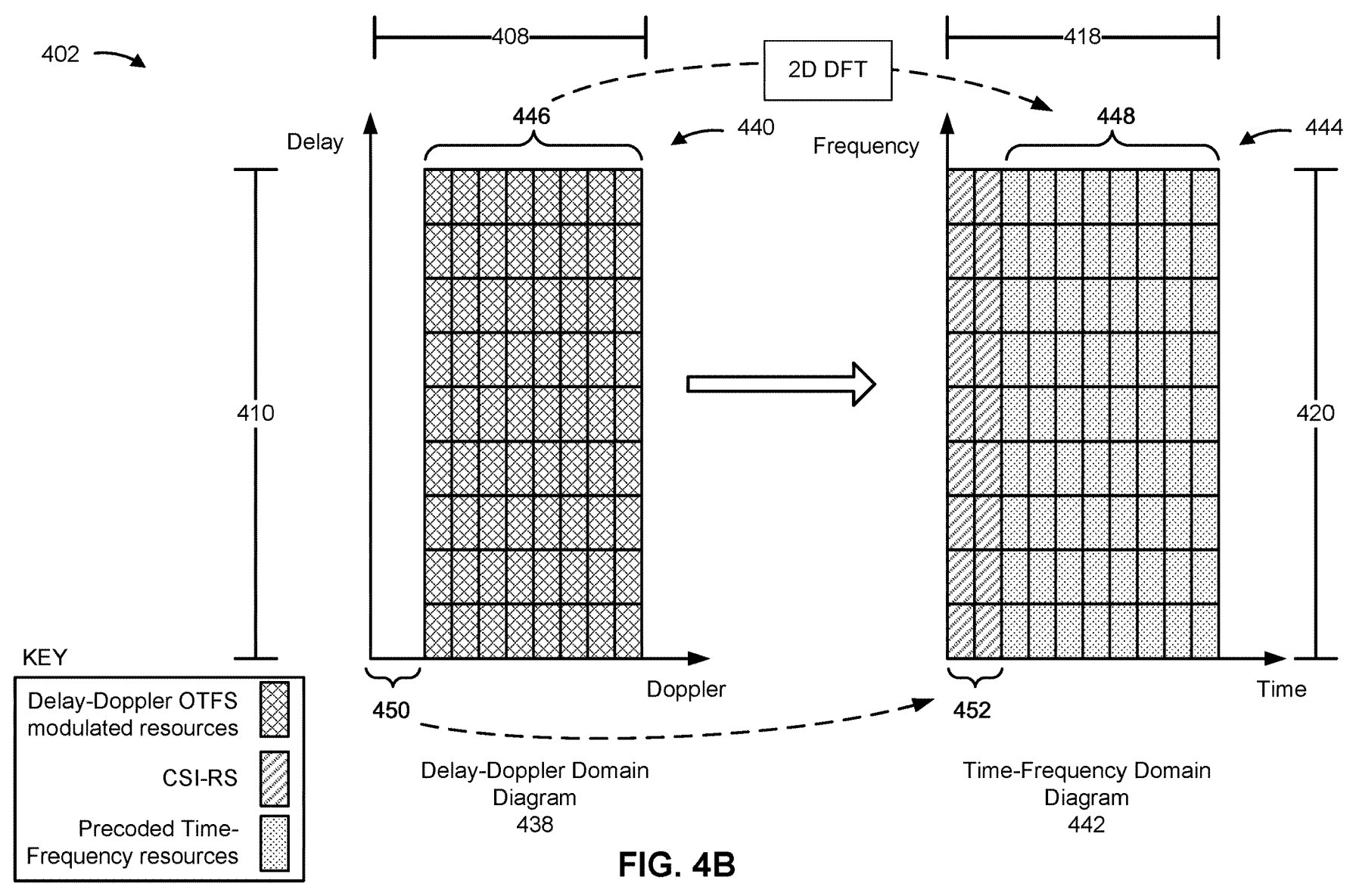

2D DFT

444

420

Time

448

418

Frequency

Time-Frequency Domain
Diagram
442

452

440

446

408

Doppler

450

Delay-Doppler Domain
Diagram
438

Delay

KEY

Delay-Doppler OTFS
modulated resources

CSI-RS

Precoded Time-
Frequency resources

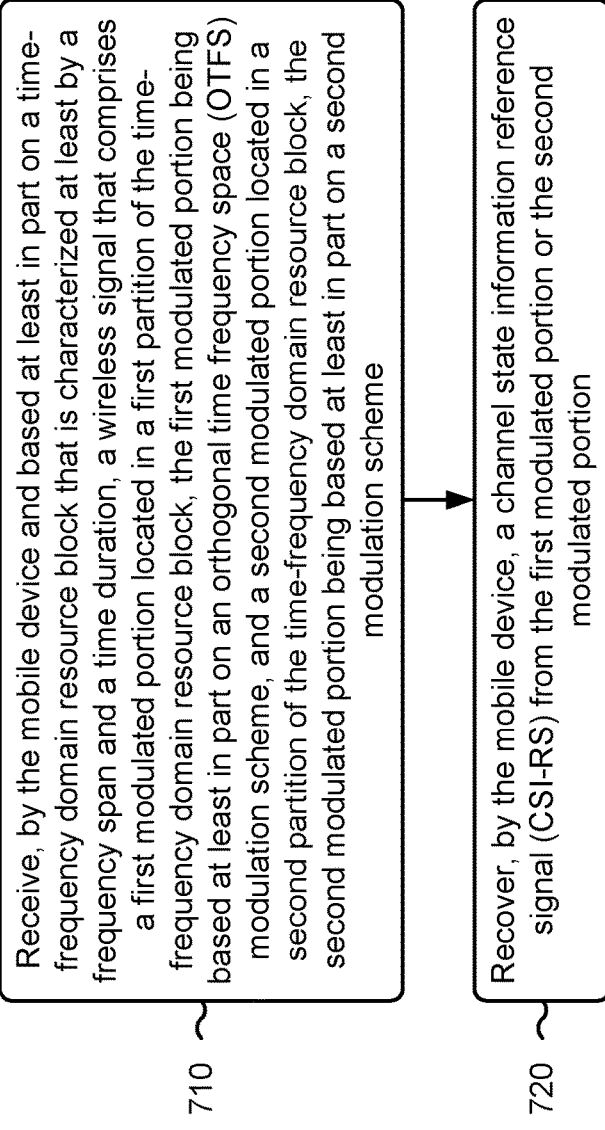

710

Receive, by the mobile device and based at least in part on a time-frequency domain resource block that is characterized at least by a frequency span and a time duration, a wireless signal that comprises a first modulated portion located in a first partition of the time-frequency domain resource block, the first modulated portion being based at least in part on an orthogonal time frequency space (OTFS) modulation scheme, and a second modulated portion located in a second partition of the time-frequency domain resource block, the second modulated portion being based at least in part on a second modulation scheme

720

Recover, by the mobile device, a channel state information reference signal (CSI-RS) from the first modulated portion or the second modulated portion

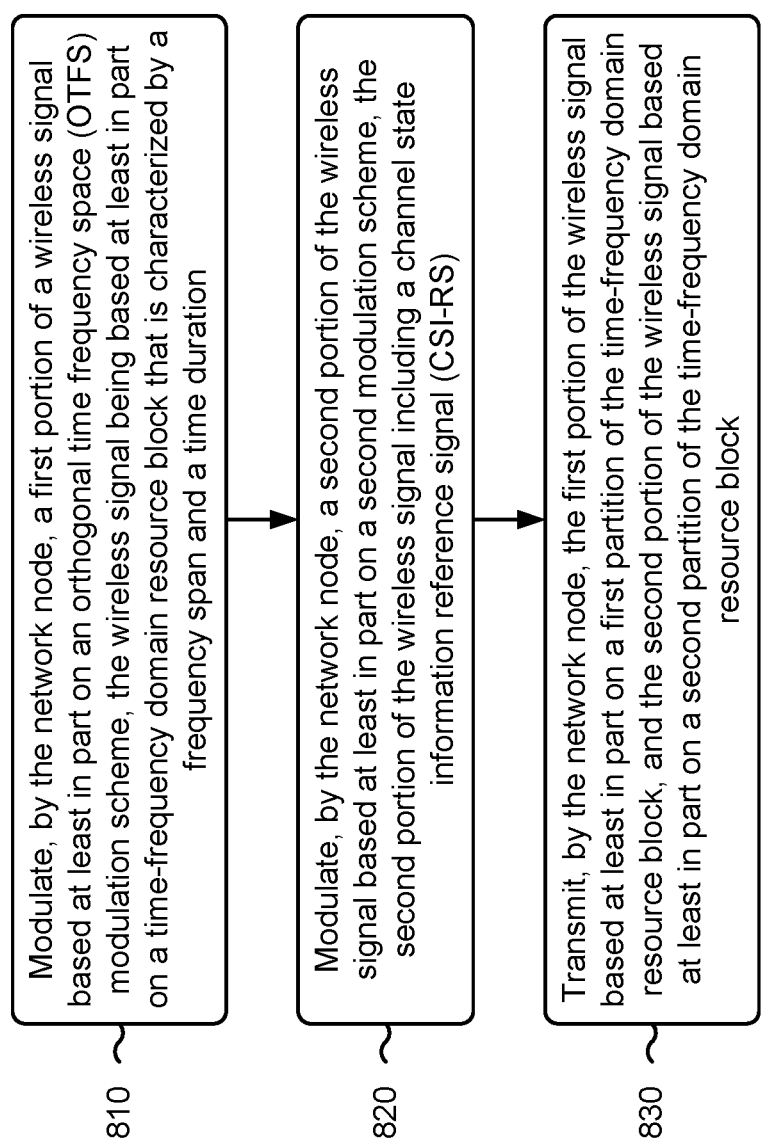

Modulate, by the network node, a first portion of a wireless signal based at least in part on an orthogonal time frequency space (OTFS) modulation scheme, the wireless signal being based at least in part on a time-frequency domain resource block that is characterized by a frequency span and a time duration

810

Modulate, by the network node, a second portion of the wireless signal based at least in part on a second modulation scheme, the second portion of the wireless signal including a channel state information reference signal (CSI-RS)

820

Transmit, by the network node, the first portion of the wireless signal based at least in part on a first partition of the time-frequency domain resource block, and the second portion of the wireless signal based at least in part on a second partition of the time-frequency domain resource block

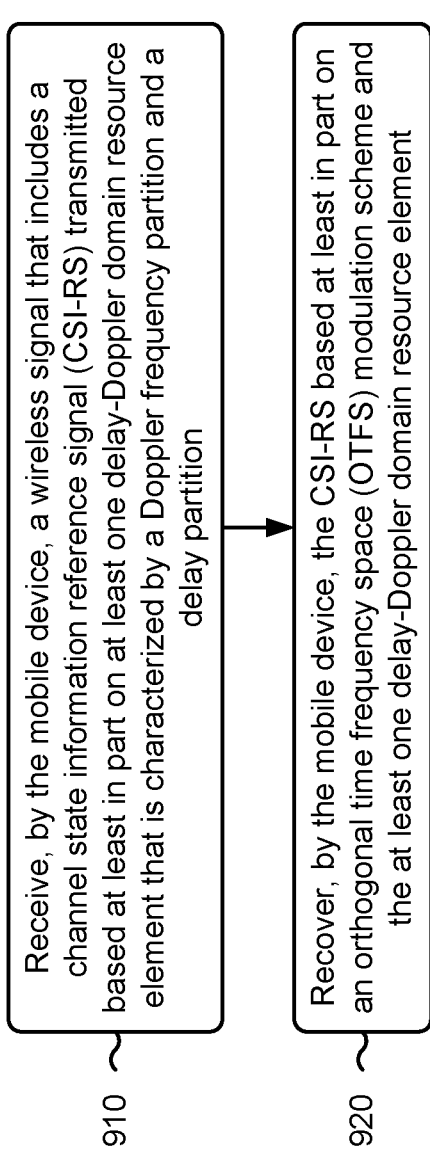

910 Receive, by the mobile device, a wireless signal that includes a channel state information reference signal (CSI-RS) transmitted based at least in part on at least one delay-Doppler domain resource element that is characterized by a Doppler frequency partition and a delay partition 920 Recover, by the mobile device, the CSI-RS based at least in part on an orthogonal time frequency space (OTFS) modulation scheme and the at least one delay-Doppler domain resource element

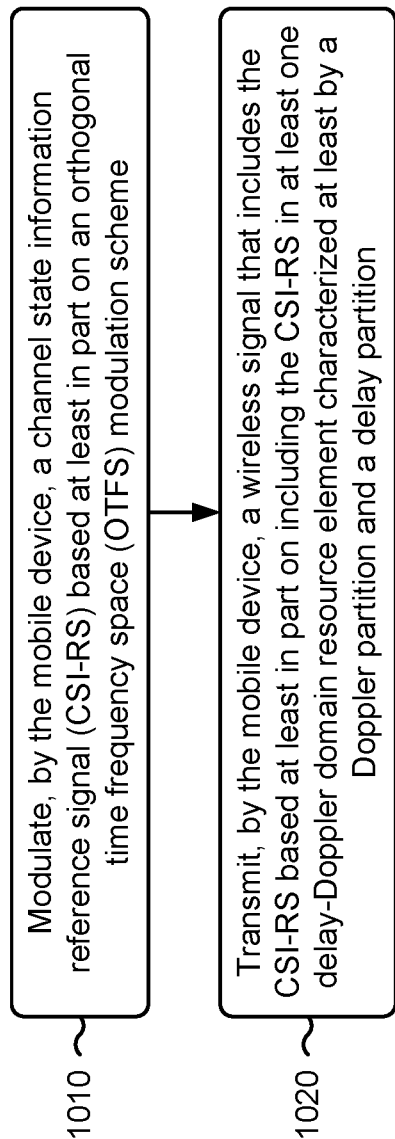

Modulate, by the mobile device, a channel state information reference signal (CSI-RS) based at least in part on an orthogonal time frequency space (OTFS) modulation scheme

1010

Transmit, by the mobile device, a wireless signal that includes the CSI-RS based at least in part on including the CSI-RS in at least one delay-Doppler domain resource element characterized at least by a Doppler partition and a delay partition

CHANNEL STATE INFORMATION REFERENCE SIGNALS IN ORTHOGONAL TIME FREQUENCY SPACE

FIELD OF THE DISCLOSURE

Aspects of the present disclosure generally relate to wireless communication and to techniques and apparatuses for channel state information reference signals in orthogonal time frequency space.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a mobile station for wireless communication. The mobile station may include a memory and one or more processors coupled to the memory. The one or more processors may be configured to, based at least in part on information stored in the memory, receive, based at least in part on a time-frequency domain resource block that is characterized at least by a frequency span and a time duration, a wireless signal that comprises a first modulated portion located in a first partition of the time-frequency domain resource block, the first modulated portion being based at least in part on an orthogonal time frequency space (OTFS) modulation scheme, and a second modulated portion located in a second partition of the time-frequency domain resource block, the second modulated portion being based at least in part on a second modulation scheme. The one or more processors may be configured to recover a channel state information reference signal (CSI-RS) from the first modulated portion or the second modulated portion.

Some aspects described herein relate to an apparatus for wireless communication at a network node. The apparatus may include a memory and one or more processors coupled to the memory. The one or more processors may be configured to, based at least in part on information stored in the memory, modulate a first portion of a wireless signal based at least in part on an OTFS modulation scheme, the wireless signal being based at least in part on a time-frequency domain resource block that is characterized by a frequency span and a time duration. The one or more processors may be configured to modulate a second portion of the wireless signal based at least in part on a second modulation scheme, the second portion of the wireless signal including a CSI-RS. The one or more processors may be configured to transmit the first portion of the wireless signal based at least in part on a first partition of the time-frequency domain resource block, and the second portion of the wireless signal based at least in part on a second partition of the time-frequency domain resource block.

Some aspects described herein relate to an apparatus for wireless communication at a mobile station. The apparatus may include a memory and one or more processors coupled to the memory. The one or more processors may be configured to, based at least in part on information stored in the memory, receive a wireless signal that includes a CSI-RS transmitted based at least in part on at least one delay-Doppler domain resource element that is characterized by a Doppler frequency partition and a delay partition. The one or more processors may be configured to recover the CSI-RS based at least in part on an OTFS modulation scheme and the at least one delay-Doppler domain resource element.

Some aspects described herein relate to an apparatus for wireless communication at a network node. The apparatus may include a memory and one or more processors coupled to the memory. The one or more processors may be configured to, based at least in part on information stored in the memory, modulate a CSI-RS based at least in part on an OTFS modulation scheme. The one or more processors may be configured to transmit a wireless signal that includes the CSI-RS based at least in part on including the CSI-RS in at least one delay-Doppler domain resource element characterized at least by a Doppler partition and a delay partition.

Some aspects described herein relate to a method of wireless communication performed by a mobile station. The method may include receiving, by the mobile station and based at least in part on a time-frequency domain resource block that is characterized at least by a frequency span and a time duration, a wireless signal that comprises a first modulated portion located in a first partition of the time-frequency domain resource block, the first modulated portion being based at least in part on an OTFS modulation scheme, and a second modulated portion located in a second partition of the time-frequency domain resource block, the second modulated portion being based at least in part on a second modulation scheme. The method may include recovering, by the mobile station, a CSI-RS from the first modulated portion or the second modulated portion.

Some aspects described herein relate to a method of wireless communication performed by a network node. The method may include modulating, by the network node, a first portion of a wireless signal based at least in part on an OTFS modulation scheme, the wireless signal being based at least in part on a time-frequency domain resource block that is characterized by a frequency span and a time duration. The method may include modulating, by the network node, a second portion of the wireless signal based at least in part on a second modulation scheme, the second portion of the wireless signal including a CSI-RS. The method may include transmitting, by the network node, the first portion of the wireless signal based at least in part on a first partition of the time-frequency domain resource block, and the second portion of the wireless signal based at least in part on a second partition of the time-frequency domain resource block.

Some aspects described herein relate to a method of wireless communication performed by a mobile station. The method may include receiving, by the mobile station, a wireless signal that includes a CSI-RS transmitted based at least in part on at least one delay-Doppler domain resource element that is characterized by a Doppler frequency partition and a delay partition. The method may include recovering, by the mobile station, the CSI-RS based at least in part on an OTFS modulation scheme and the at least one delay-Doppler domain resource element.

Some aspects described herein relate to a method of wireless communication performed by a network node. The method may include modulating, by the mobile station, a CSI-RS based at least in part on an OTFS modulation scheme. The method may include transmitting, by the mobile station, a wireless signal that includes the CSI-RS based at least in part on including the CSI-RS in at least one delay-Doppler domain resource element characterized at least by a Doppler partition and a delay partition.

Some aspects described herein relate to a non-transitory computer-readable medium that stores a set of instructions for wireless communication by a mobile station. The set of instructions, when executed by one or more processors of the mobile station, may cause the mobile station to receive, based at least in part on a time-frequency domain resource block that is characterized at least by a frequency span and a time duration, a wireless signal that comprises. The set of instructions, when executed by one or more processors of the mobile station, may cause the mobile station to recover a CSI-RS from the first modulated portion or the second modulated portion.

Some aspects described herein relate to a non-transitory computer-readable medium that stores a set of instructions for wireless communication by a network node. The set of instructions, when executed by one or more processors of the network node, may cause the network node to modulate a first portion of a wireless signal based at least in part on an OTFS modulation scheme, the wireless signal being based at least in part on a time-frequency domain resource block that is characterized by a frequency span and a time duration. The set of instructions, when executed by one or more processors of the network node, may cause the network node to modulate a second portion of the wireless signal based at least in part on a second modulation scheme, the second portion of the wireless signal including a CSI-RS. The set of instructions, when executed by one or more processors of the network node, may cause the network node to transmit the first portion of the wireless signal based at least in part on a first partition of the time-frequency domain resource block, and the second portion of the wireless signal based at least in part on a second partition of the time-frequency domain resource block.

Some aspects described herein relate to a non-transitory computer-readable medium that stores a set of instructions for wireless communication by a mobile station. The set of instructions, when executed by one or more processors of the mobile station, may cause the mobile station to receive a wireless signal that includes a CSI-RS transmitted based at least in part on at least one delay-Doppler domain resource element that is characterized by a Doppler frequency partition and a delay partition. The set of instructions, when executed by one or more processors of the mobile station, may cause the mobile station to recover the CSI-RS based at least in part on an OTFS modulation scheme and the at least one delay-Doppler domain resource element.

Some aspects described herein relate to a non-transitory computer-readable medium that stores a set of instructions for wireless communication by a network node. The set of instructions, when executed by one or more processors of the network node, may cause the network node to modulate a CSI-RS based at least in part on an OTFS modulation scheme. The set of instructions, when executed by one or more processors of the network node, may cause the network node to transmit a wireless signal that includes the CSI-RS based at least in part on including the CSI-RS in at least one delay-Doppler domain resource element characterized at least by a Doppler partition and a delay partition.

Some aspects described herein relate to an apparatus for wireless communication. The apparatus may include means for receiving, based at least in part on a time-frequency domain resource block that is characterized at least by a frequency span and a time duration, a wireless signal that comprises, a first modulated portion located in a first partition of the time-frequency domain resource block, the first modulated portion being based at least in part on an OTFS modulation scheme, and a second modulated portion located in a second partition of the time-frequency domain resource block, the second modulated portion being based at least in part on a second modulation scheme. The apparatus may include means for recovering a CSI-RS from the first modulated portion or the second modulated portion.

Some aspects described herein relate to an apparatus for wireless communication. The apparatus may include means for modulating a first portion of a wireless signal based at least in part on an OTFS modulation scheme, the wireless signal being based at least in part on a time-frequency domain resource block that is characterized by a frequency span and a time duration. The apparatus may include means for modulating a second portion of the wireless signal based at least in part on a second modulation scheme, the second portion of the wireless signal including a CSI-RS. The apparatus may include means for transmitting the first portion of the wireless signal based at least in part on a first partition of the time-frequency domain resource block, and the second portion of the wireless signal based at least in part on a second partition of the time-frequency domain resource block.

Some aspects described herein relate to an apparatus for wireless communication. The apparatus may include means for receiving a wireless signal that includes a CSI-RS transmitted based at least in part on at least one delay-Doppler domain resource element that is characterized by a Doppler frequency partition and a delay partition. The apparatus may include means for recovering the CSI-RS based at least in part on an OTFS modulation scheme and the at least one delay-Doppler domain resource element.

Some aspects described herein relate to an apparatus for wireless communication. The apparatus may include means for modulating a CSI-RS based at least in part on an OTFS modulation scheme. The apparatus may include means for transmitting a wireless signal that includes the CSI-RS based at least in part on including the CSI-RS in at least one delay-Doppler domain resource element characterized at least by a Doppler partition and a delay partition.

Aspects generally include a method, apparatus, system, computer program product, non-transitory computer-readable medium, mobile station, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A, 4B, and 4C are diagrams illustrating a first example, a second example, and a third example, respectively, of a wireless signal configuration for transmitting a channel state information reference signal (CSI-RS), in accordance with the present disclosure.

FIG. 7 is a diagram illustrating an example process performed, for example, by a mobile station, in accordance with the present disclosure.

FIG. 8 is a diagram illustrating an example process performed, for example, by a network node, in accordance with the present disclosure.

FIG. 9 is a diagram illustrating an example process performed, for example, by a mobile station, in accordance with the present disclosure.

FIG. 10 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
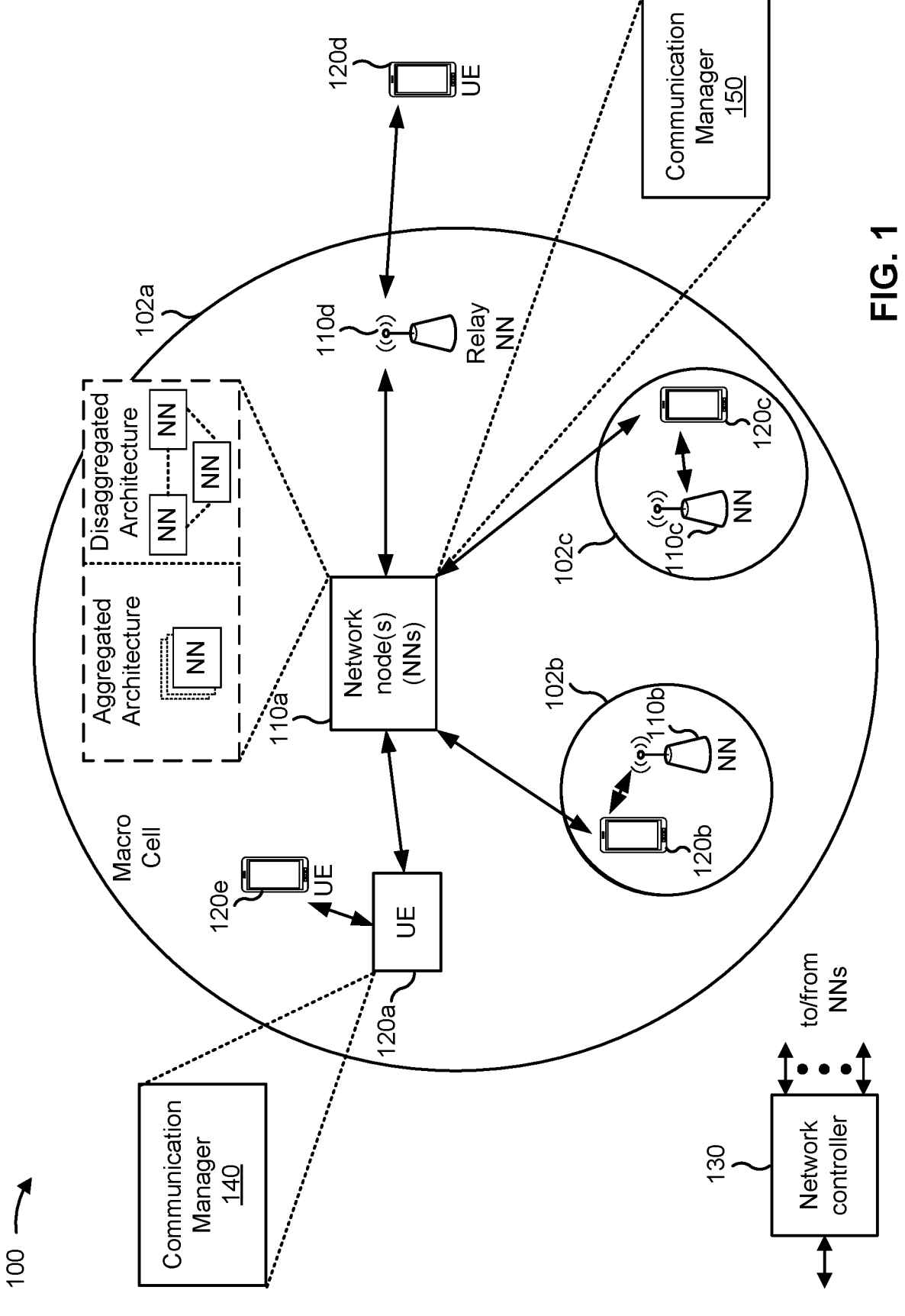
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the mobile station may include a communication manager 140. As described in more detail elsewhere herein, the communication manager 140 may receive, based at least in part on a time-frequency domain resource block that is characterized at least by a frequency span and a time duration, a wireless signal that includes: a first modulated portion located in a first partition of the time-frequency domain resource block, the first modulated portion being based at least in part on an orthogonal time frequency space (OTFS) modulation scheme, and a second modulated portion located in a second partition of the time-frequency domain resource block, the second modulated portion being based at least in part on a second modulation scheme; and recover a channel state information reference signal (CSI-RS) from the first modulated portion or the second modulated portion.

In some aspects, and as described in more detail elsewhere herein, the communication manager 140 may receive a wireless signal that includes a CSI-RS transmitted based at least in part on at least one delay-Doppler domain resource element that is characterized by a Doppler frequency partition and a delay partition; and recover the CSI-RS based at least in part on an OTFS modulation scheme and the at least one delay-Doppler domain resource element. Additionally, or alternatively, the communication manager 140 may perform one or more other operations described herein.

In some aspects, the network node may include a communication manager 150. As described in more detail elsewhere herein, the communication manager 150 may modulate a first portion of a wireless signal based at least in part on an OTFS modulation scheme, the wireless signal being based at least in part on a time-frequency domain resource block that is characterized by a frequency span and a time duration; modulate a second portion of the wireless signal based at least in part on a second modulation scheme, the second portion of the wireless signal including a CSI-RS; and transmit the first portion of the wireless signal based at least in part on a first partition of the time-frequency domain resource block, and the second portion of the wireless signal based at least in part on a second partition of the time-frequency domain resource block.

In some aspects, the communication manager 150 may modulate a CSI-RS based at least in part on an OTFS modulation scheme; and transmit a wireless signal that includes the CSI-RS based at least in part on including the CSI-RS in at least one delay-Doppler domain resource element characterized at least by a Doppler partition and a delay partition. Additionally, or alternatively, the communication manager 150 may perform one or more other operations described herein.

As indicated above, FIG. 1 is provided as an example. Other examples may differ from what is described with regard to FIG. 1.

Figure 2:
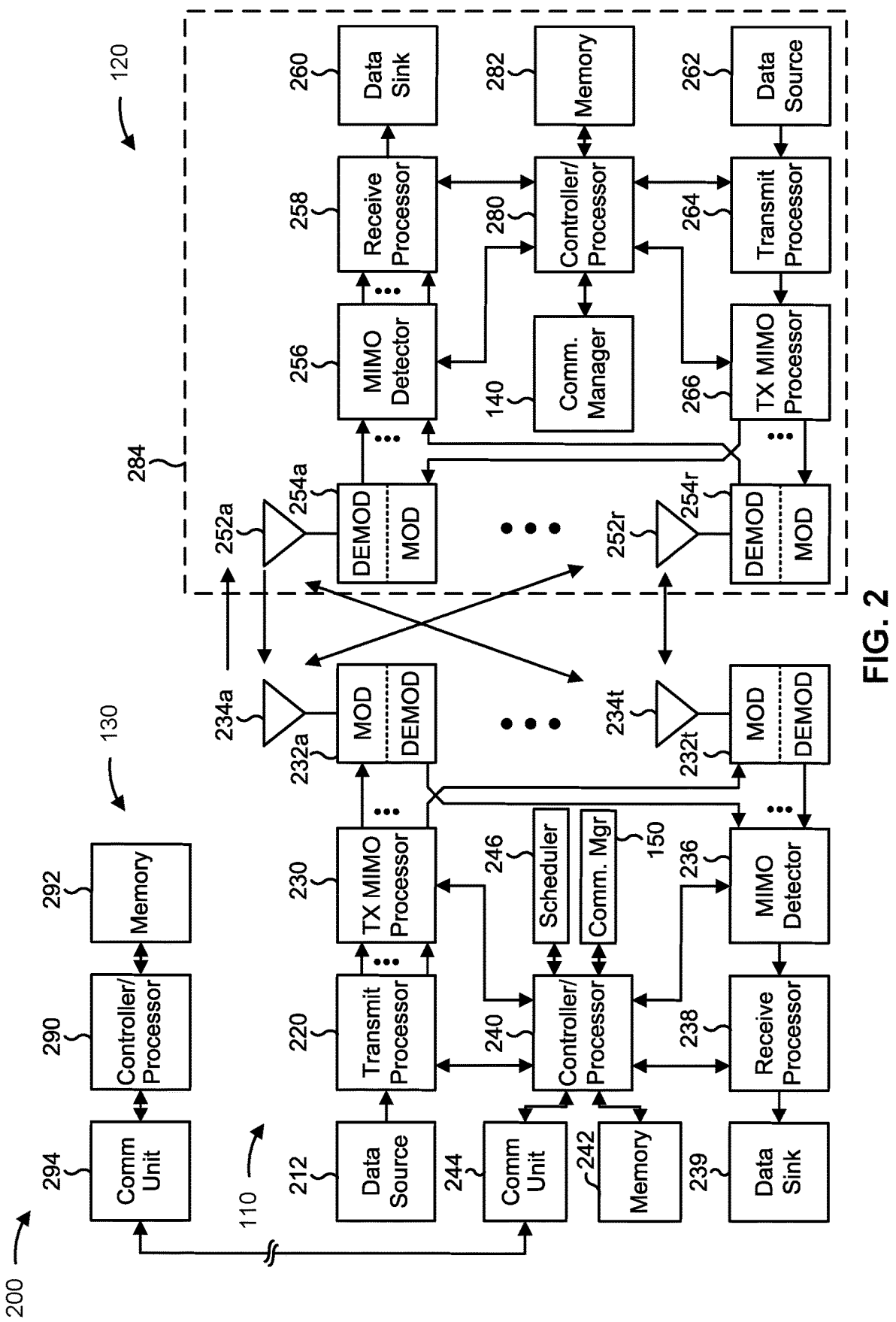
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-12).

The controller/processor 240 of the network node 110, the controller/processor 280 of the UE 120, and/or any other component(s) of FIG. 2 may perform one or more techniques associated with CSI-RS in orthogonal time frequency space, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a mobile station (e.g., the UE 120) includes means for receiving, by the mobile station and based at least in part on a time-frequency domain resource block that is characterized at least by a frequency span and a time duration, a wireless signal that includes: a first modulated portion located in a first partition of the time-frequency domain resource block, the first modulated portion being based at least in part on an OTFS modulation scheme, and a second modulated portion located in a second partition of the time-frequency domain resource block, the second modulated portion being based at least in part on a second modulation scheme; and/or means for recovering, by the mobile station, a CSI-RS from the first modulated portion or the second modulated portion. Alternatively or additionally, in some aspects, a mobile station (e.g., the UE 120) includes means for receiving, by the mobile station, a wireless signal that includes a CSI-RS transmitted based at least in part on at least one delay-Doppler domain resource element that is characterized by a Doppler frequency partition and a delay partition; and/or means for recovering, by the mobile station, the CSI-RS based at least in part on an OTFS modulation scheme and the at least one delay-Doppler domain resource element. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for modulating, by the network node, a first portion of a wireless signal based at least in part on an OTFS modulation scheme, the wireless signal being based at least in part on a time-frequency domain resource block that is characterized by a frequency span and a time duration; means for modulating, by the network node, a second portion of the wireless signal based at least in part on a second modulation scheme, the second portion of the wireless signal including CSI-RS; and/or means for transmitting, by the network node, the first portion of the wireless signal based at least in part on a first partition of the time-frequency domain resource block, and the second portion of the wireless signal based at least in part on a second partition of the time-frequency domain resource block.

In some aspects, a network node (e.g., the network node 110) includes means for modulating, by the network node, a CSI-RS based at least in part on an OTFS modulation scheme; and/or means for transmitting, by the network node, a wireless signal that includes the CSI-RS based at least in part on including the CSI-RS in at least one delay-Doppler domain resource element characterized at least by a Doppler partition and a delay partition. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
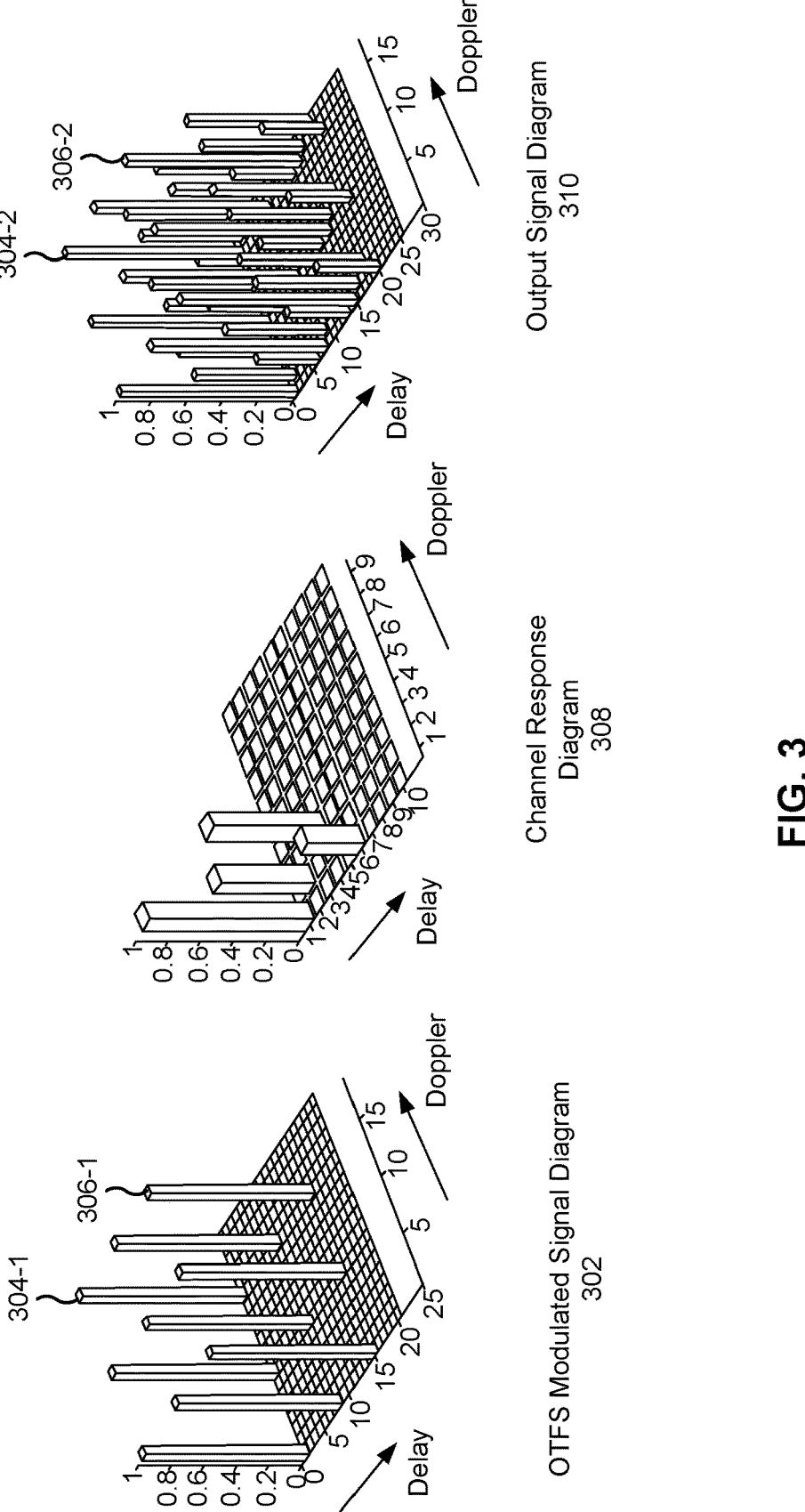
FIG. 3 is a diagram illustrating an example 300 of distortion incurred by an orthogonal time frequency space (OTFS) modulated symbol, in accordance with the present disclosure.

FIG. 3 is a diagram illustrating an example 300 of distortion incurred by an OTFS modulated symbol, in accordance with the present disclosure.

The demand for services provided by a wireless network continues to increase as more and more devices access the wireless network. The availability of communication resources (e.g., frequency resources and/or time resources) to provide these services becomes proportionally strained as the number of devices accessing the wireless network increases. As an added complexity, some devices may request increased data throughput and/or lower data-transfer latency relative to other devices, such as when a device executes an application that consumes large quantities of data and/or has time-sensitive needs (e.g., streaming video, streaming audio, video calling, gaming, and/or emergency services).

OFDM provides more spectral efficiency relative to other modulation schemes which, in turn, enables higher frequency transmissions using OFDM to transmit data with an increased throughput relative to the other modulation schemes. Diverse environments, however, may reduce the throughput gains associated with using OFDM. To illustrate, motion associated with V2X communications may cause spectral broadening (e.g., measured as Doppler spread) that degrades an OFDM signal, reduces a realizable spectral efficiency, and/or reduces data throughput.

Orthogonal time frequency space (OTFS) modulation is a two-dimensional (2D) modulation scheme that modulates information symbols (e.g., a quadrature amplitude modulation (QAM) symbol) in the delay-Doppler domain. In some aspects, an OTFS modulated signal may be less susceptible to spectral broadening, relative to an OFDM modulated signal. Consequently, in environments with high mobility at a transmitter and/or a receiver, OTFS modulation may improve how a receiving device recovers information (e.g., reduces recovery errors) from a signal, relative to OFDM modulation.

The example 300 includes an input signal diagram 302 that illustrates an OTFS modulated signal in the delay-Doppler domain. A first axis of the diagram 302 represents a delay, a second axis of the diagram 302 represents Doppler, and a third axis represents a normalized power. As shown by the diagram 302, each modulated symbol may be represented as an impulse characterized, at least in part, by a respective delay value and a respective Doppler value. To illustrate, a first modulated symbol 304-1 may be represented as a first impulse characterized by a first delay value and first Doppler value, and a second modulated symbol 306-1 may be represented as a second impulse characterized by a second, different delay value and a second, different Doppler value.

The example 300 also illustrates a transmission channel response diagram 308 that characterizes the channel response in the delay-Doppler domain. In the delay-Doppler domain, the transmission channel response may be localized to center (e.g., less delay and/or less Doppler). As the input signal propagates through the transmission channel, the input signal may incur some distortion, which may be estimated through the convolution of the input signal shown by the diagram 302 with the transmission channel response shown by the channel response diagram 308.

Output signal diagram 310 illustrates an example of how the input signal may be altered based at least in part on transmission through the channel. As shown by the diagram 310, the received signal (e.g., the input signal convolved with the channel response) may include a first received symbol 304-2 (e.g., a received version of the first input symbol 304-1) and a second received symbol 306-2 (e.g., a received version of the second input symbol 306-1). Although the received output signal may include additional components relative to the input signal, the received symbol 304-2 and the received symbol 306-2 may incur less distortion in the delay-Doppler domain relative to a time-based symbol. A wireless signal may be represented in the time domain as a function of time, in the frequency domain as a function of frequency, and/or in the delay-Doppler domain as a function of delay and Doppler. Accordingly, various transforms may be applied to convert a signal representation between the delay-Doppler domain to the time domain and/or the frequency domain such that a signal may be initially modulated in the delay-Doppler domain and subsequently transformed into the time domain for transmission. Alternatively or additionally, a received signal may be received in the time domain and converted to the delay-Doppler domain for symbol recovery.

In some aspects, a network node may transmit a channel state information reference signal (CSI-RS) to a UE and direct the UE to generate one or more metrics (e.g., CSI) that may be used to characterize a transmission channel between the network node and the UE. Based at least in part on receiving the metrics, the network node may select a modulation and coding scheme (MCS) that improves a signal quality of a transmission (e.g., relative to another MCS scheme) for the current transmission channel. However, the application of OTFS modulation to a signal may cause erroneous CSI-RS recovery and/or CSI-RS recovery failure at the UE. Erroneous or failed CSI-RS recovery may result in the UE generating a metric that provides erroneous information about the transmission channel between the UE and the network node. In turn, the network node may select an MCS that results in poor signal quality, which results in increased data recovery errors, reduced data throughput, and/or increased data transfer latencies at the UE relative to a better signal quality associated with using another MCS.

Some techniques and apparatuses described herein provide channel state information reference signals in orthogonal time frequency space. A mobile station may receive, based at least in part on a time-frequency domain resource block that is characterized at least by a frequency span and a time duration, a wireless signal that includes a first modulated portion located in a first partition of the time-frequency domain resource block, where the first modulated portion may be based at least in part on an OTFS modulation scheme. Alternatively or additionally, a mobile station may receive a second modulated portion located in a second partition of the time-frequency domain resource block, where the second modulated portion being based at least in part on a second modulation scheme. The mobile station may recover a CSI-RS from the first modulated portion or the second modulated portion. To illustrate, the mobile station may coordinate with a network node to identify the CSI-RS is carried in the second modulated portion of the wireless signal.

Coordinating the transmission of a CSI-RS between a network node and a UE may improve the recovery of the CSI-RS (e.g., reduced noise in the CSI-RS and/or improved identification of the CSI-RS) by the UE. Improved recovery of the CSI-RS may enable the UE to generate, based at least in part on the CSI-RS, one or more metrics that characterize the transmission channel between the network node and the UE with more accuracy relative to a metric based on CSI-RS that includes more noise. The metrics with higher accuracy enable the network node to select a transmission configuration (e.g., an MCS) that improves a signal quality at the UE, reduces data recovery errors, improves data throughput, and/or decreases data transfer latencies relative to other transmission configurations.

As indicated above, FIG. 3 is provided as an example. Other examples may differ from what is described with regard to FIG. 3.

Figure 4A:
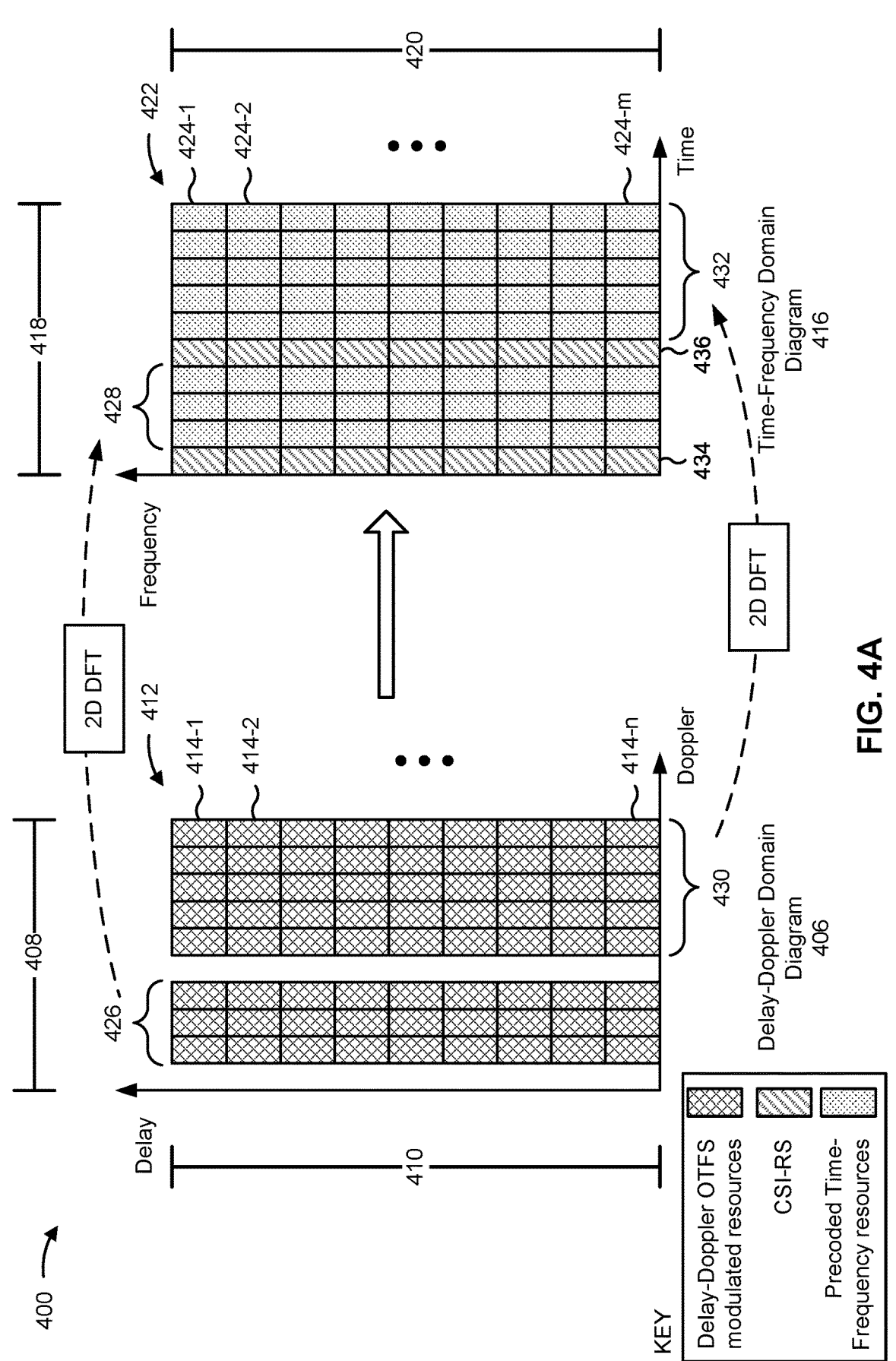
Figure 4C:
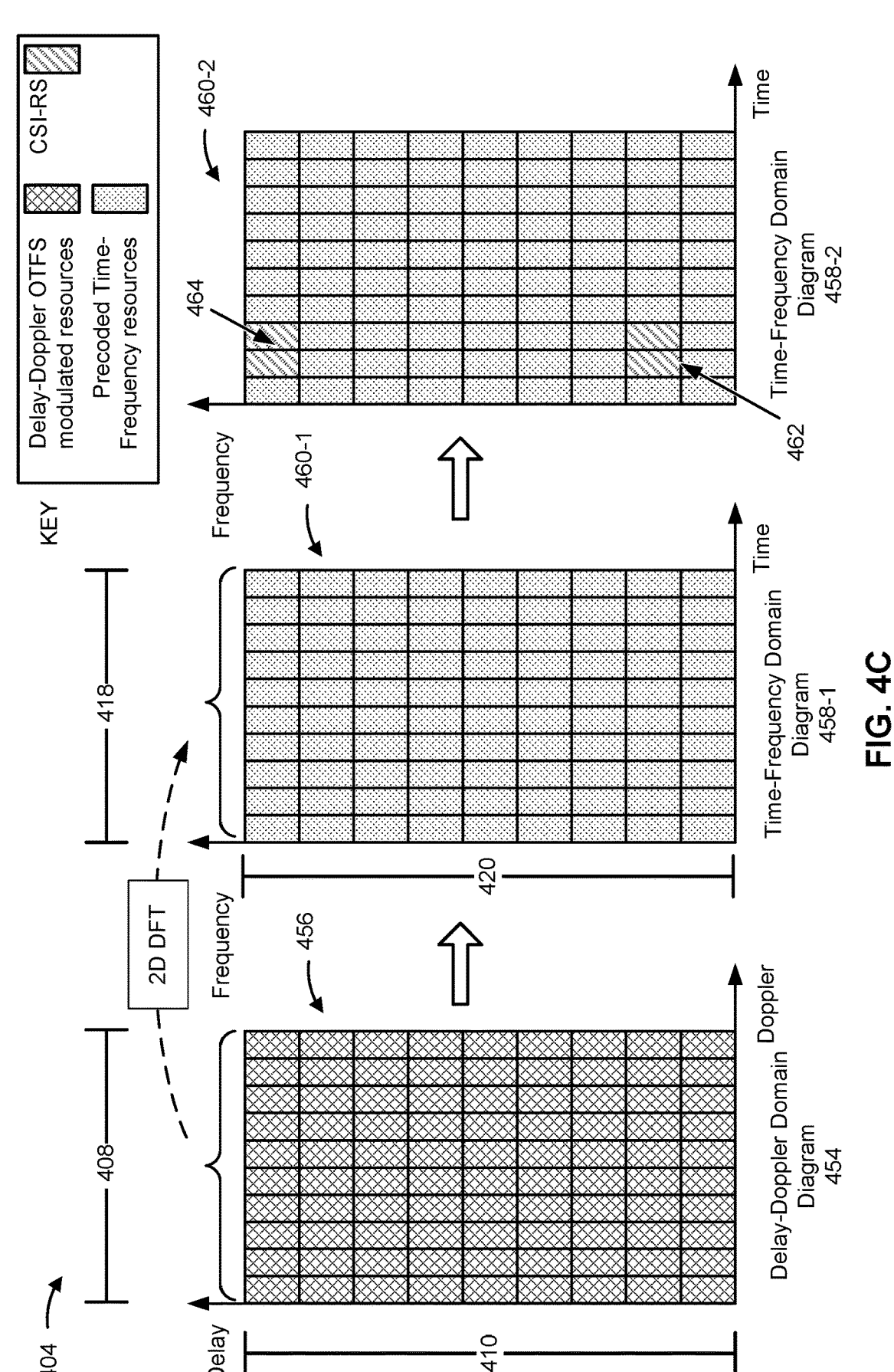

FIGS. 4A, 4B, and 4C are diagrams illustrating a first example 400, a second example 402, and a third example 404, respectively, of a wireless signal configuration for transmitting a CSI-RS, in accordance with the present disclosure. Each wireless signal configuration may include a first portion that is configured based at least in part on a delay-Doppler domain and a second portion that is configured based at least in part on a time-frequency domain. To illustrate, a network node (e.g., the network node 110) may transmit the CSI-RS based at least in part on applying OTFS modulation to a first portion of the wireless signal and not applying OTFS modulation from a second portion of the wireless signal.

The example 400 of FIG. 4A includes a delay-Doppler domain diagram 406. A horizontal axis of the delay-Doppler diagram 406 represents Doppler and a vertical axis of the delay-Doppler diagram represents delay. A Doppler span 408 and a delay span 410 may characterize a delay-Doppler domain resource block 412. The delay-Doppler domain resource block 412 may include multiple delay-Doppler domain resource elements, shown as a first delay-Doppler domain resource element 414-1, a second delay-Doppler domain resource element 414-2, up to an $n^{th}$ delay-Doppler domain resource element 414-n, where n is an integer. Each delay-Doppler domain resource element may be characterized by a respective Doppler partition of the Doppler span 408 and a respective delay partition of the delay span 410.

The example 400 also includes a time-frequency domain diagram 416 that may represent a portion of the delay-Doppler domain diagram 402 in the time-domain as further described. A horizontal axis of the time-frequency domain diagram 416 represents time and a vertical axis of the time-frequency domain diagram 416 represents frequency. A time duration 418 and a frequency span 420 may characterize a time-frequency domain resource block 422, which may also be referred to as a resource block. The time-frequency domain resource block 422 may include multiple time-frequency domain resource elements (also referred to as resource elements), shown as a first time-frequency domain resource element 424-1, a second time-frequency domain resource element 424-2, up to an $m^{th}$ time-frequency domain resource element 424-m, where m is an integer that may be greater than, equal to, or less than n. Each time-frequency domain resource element may be characterized by a respective time partition of the time duration 418 and a respective frequency partition of the frequency span 420.

In some aspects, a network node (e.g., the network node 110) may generate a wireless signal based at least in part on a first portion of the delay-Doppler domain resource block 412 and a second portion of the time-frequency domain resource block 422. To illustrate, the network node may modulate a first portion of data based at least in part on an OTFS modulation scheme and the delay-Doppler domain resource elements 426 that are associated with (e.g., map to or convert to) the time-frequency resource elements 428. The network node may alternatively or additionally modulate a second portion of data based at least in part on the OTFS modulation scheme and the delay-Doppler domain resource elements 430 that are associated with (e.g., map to or convert to) the time-frequency resource elements 432. As shown by the example 400, the network node may use discontinuous and/or non-adjacent delay-Doppler domain resource elements, such as by refraining from using delay-Doppler domain resource elements at a start of the delay-Doppler domain resource block 412 (shown in the example 400), delay-Doppler domain resource elements in a middle of the delay-Doppler domain resource block 412 (shown in the example 400), and/or delay-Doppler domain resource elements at an end of the delay-Doppler domain resource block 412 (not shown in the example 400). In some aspects, the network node may apply a 2D discrete Fourier transform (DFT) precoding to the OTFS modulated data, as shown by the example 400.

The network node may generate a second portion of the wireless signal that carries the CSI-RS based at least in part on one or more empty time-frequency domain resource elements. "Empty time-frequency domain resource element" may denote a time-frequency domain resource element that lacks an OTFS modulated signal (e.g., generated by the network node) in the frequency partition and/or time partition associated with the time-frequency domain resource element. As one example, the network node may generate the second portion by modulating the CSI-RS based at least in part on the OFDM modulation scheme, using a first set of time-frequency resource elements 434 to carry the CSI-RS, and a second set of time-frequency resource elements 436 to carry the CSI-RS. In some aspects, the network node may use a wireless signal configuration in which one or more time-frequency domain resource elements are discontinuous and/or non-adjacent to one another, as shown by the example 400. However, in other examples, the time-frequency domain resource elements may be adjacent to one another.

The example 402 shown by FIG. 4B includes a second delay-Doppler domain diagram 438 that illustrates a second delay-Doppler domain resource block 440 that may be characterized by the Doppler span 408 and the delay span 410. The example 402 also includes a second time-frequency domain diagram 442 that illustrates a second time-frequency domain resource block 444 that may be characterized by the time duration 418 and the frequency span 420. The second delay-Doppler domain resource block 440 and/or the second time-frequency domain resource block 444 may be further partitioned into respective resource elements as further described above. As shown by the example 402, a network node (e.g., the network node 110) may modulate data based at least in part on an OTFS modulation scheme and using contiguous and/or adjacent delay-Doppler domain resource elements 446 within the second delay-Doppler domain resource block 440. Alternately or additionally, the network node may refrain from using non-adjacent delay-Doppler domain resource elements for the OTFS modulated data. The adjacent delay-Doppler domain resource elements 446 may correspond to a contiguous set of time-frequency domain resource elements 448. In some aspects, the network node may apply 2D DFT precoding to the OTFS modulated data.

The network node may refrain from using a portion of the delay-Doppler domain resource block 440 for OTFS modulated data, shown by the example 402 as empty delay-Doppler domain resource elements 450. "Empty delay-Doppler domain resource element" may denote a delay-Doppler domain resource element that the network node refrains from selecting for a transmission and/or a delay-Doppler domain resource element that excludes OTFS modulated data (e.g., generated by the network node) in the corresponding delay partition and/or Doppler partition. In some aspects, the network node may select and/or group adjacent delay-Doppler domain resources as the empty delay-Doppler domain resource elements 450. The adjacent empty delay-Doppler domain resource elements 450 may correspond to empty, adjacent time-frequency domain resource elements 452 that are positioned at a start of the time-frequency domain resource block 444 or an end of the time-frequency domain resource block 444. The network node may generate a second portion of the wireless signal based at least in part on using the empty, adjacent time-frequency domain resource elements 452 to carry the CSI-RS, and a second modulation scheme (e.g., the OFDM modulation scheme) to modulate the CSI-RS. By using a first contiguous block of delay-Doppler resource elements for the OTFS modulated data and a second contiguous block of time-frequency resource elements for the CSI-RS, the network node may minimize switching between transmitting signal portions that include OTFS modulation and signal portions that do not include OTFS modulation. Minimizing switching between signal portions with different modulation schemes may improve an efficiency of a transmitter by reducing hardware reconfigurations and/or reducing power consumption.

As shown by the example 404 of FIG. 4C, a network node (e.g., the network node 110) may puncture OTFS modulated data in the time-frequency domain with a CSI-RS. The example 404 includes a third delay-Doppler domain diagram 454 of a third delay-Doppler domain resource block 456 characterized by the Doppler span 408 and the delay span 410. The third delay-Doppler domain resource block 456 may be further partitioned into delay-Doppler domain resource elements as further described above.

The example 404 also includes two instances of a third time-frequency domain diagram, shown as time-frequency domain diagram 458-1 and time-frequency domain diagram 458-2, respectively. The two instances of the time-frequency domain diagram may be collectively referred to as the third time-frequency domain diagram 458, while specific instances may be referred to with a sub-designator (e.g., -1 or -2). The example 404 also illustrates two instances of a third time-frequency domain resource block, time-frequency domain resource block 460-1 and time-frequency domain resource block 460-2, respectively, that is characterized by the time duration 418 and the frequency span 420 (shown by the time-frequency domain diagram 458-1). The two instances of the third time-frequency resource block may be collectively referred to as the third time-frequency domain resource block 460, while specific instances are referred to with a sub-designator (e.g., -1 or -2). The third time-frequency domain resource block 460 may be further partitioned into time-frequency domain resource elements as further described above.

In some aspects, the network node may generate a wireless signal based at least in part on modulating data using the OTFS modulation scheme and an entirety of a delay-Doppler domain resource block (or a portion of the delay-Doppler domain resource block with contiguous delay-Doppler domain resource elements). To illustrate, the network node may use all delay-Doppler domain resource elements of the delay-Doppler domain resource block 456 for OTFS modulated data, and apply 2D DFT precoding to the OTFS modulated data. As shown by the example 404, the delay-Doppler domain resource block 456 may correspond to an entirety of the time-frequency domain resource block 460-1 shown by the time-frequency domain diagram 458-1. For example, the entirety of the delay-Doppler domain resource elements of the delay-Doppler domain resource block 456 may map to an entirety of time-frequency domain resource elements associated with the time-frequency domain resource block 460-1.

As shown by the time-frequency domain resource block 460-2 of the time-frequency diagram 458-2, the network node may puncture the time-frequency domain resource block 460-2 by replacing a first signal (e.g., the OTFS modulated and precoded signal) present in one or more time-frequency resource elements with a second signal (e.g., the CSI-RS). For example, the network node may replace one or more time-frequency domain resource elements, as shown by reference number 462, with CSI-RSs, and/or one or more resource elements, as shown by reference number 464, with CSI-RSs.

As indicated above, FIGS. 4A, 4B, and 4C are provided as examples. Other examples may differ from what is described with regard to FIGS. 4A, 4B, and 4C.

Figure 5:
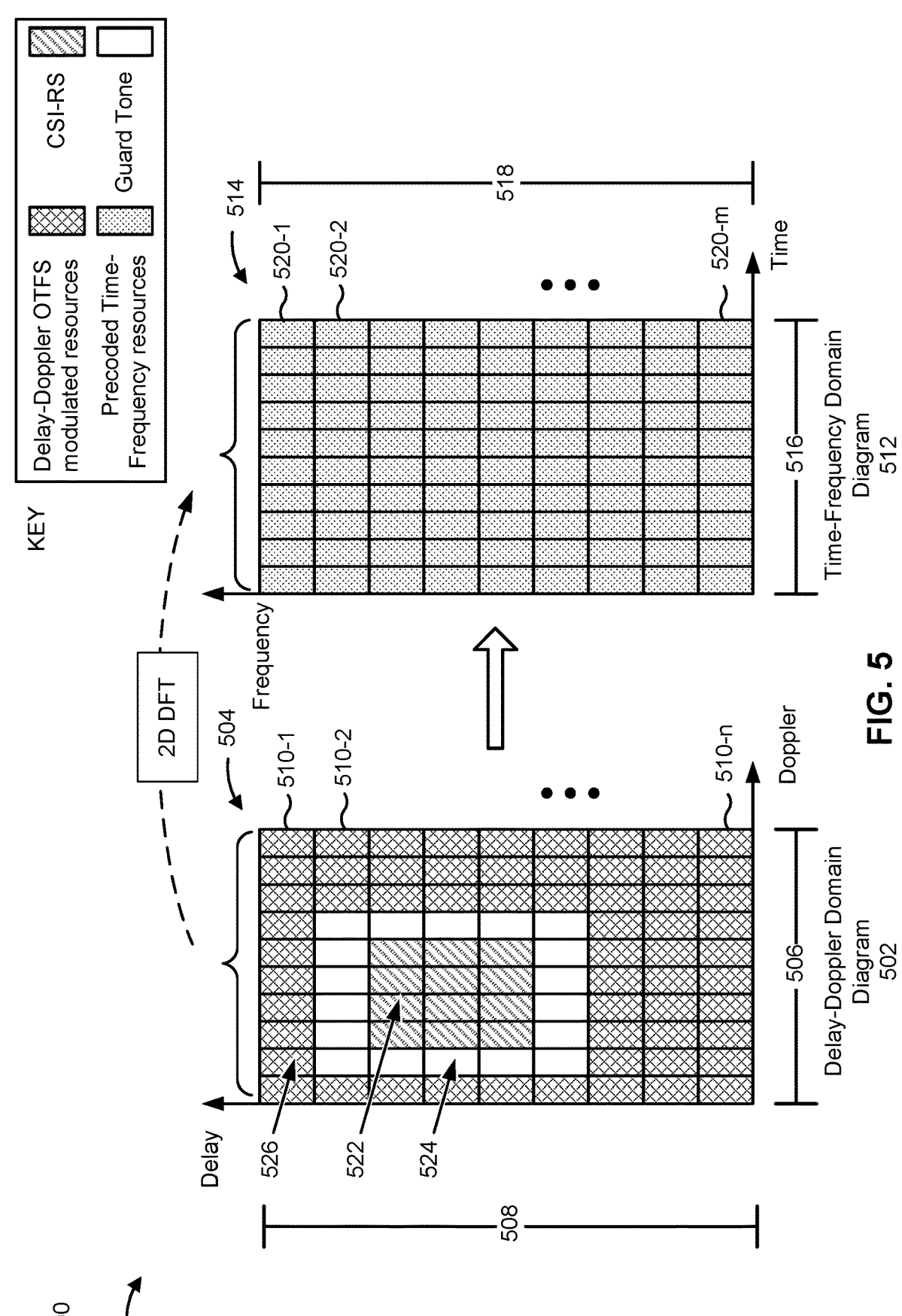
FIG. 5 is a diagram illustrating an example of an OTFS modulated CSI-RS, in accordance with the present disclosure.

FIG. 5 is a diagram illustrating an example 500 of an OTFS modulated CSI-RS, in accordance with the present disclosure.

The example 500 includes a delay-Doppler domain diagram 502 with a horizontal axis that represents Doppler and a vertical axis that represents delay. The delay-Doppler domain diagram 502 includes a delay-Doppler domain resource block 504 that may be characterized by a Doppler span 506 and a delay span 508. The delay-Doppler domain resource block 504 may include further partitioning, shown by the example 500 as a first delay-Doppler domain resource element 510-1, a second delay-Doppler domain resource element 510-2, up to an $n^{th}$ delay-Doppler domain resource element 510-$n$, where n is an integer.

The example 500 also includes a time-frequency domain diagram 512 with a horizontal axis that represents time and a vertical axis that represents frequency. The time-frequency domain diagram 512 includes a time-frequency domain resource block 514 that may be characterized by a time duration 516 and a frequency span 518. The time-frequency domain resource block 514 may include further partitioning, shown by the example 500 as a first time-frequency domain resource element 520-1, a second time-frequency domain resource element 520-2, up to an $m^{th}$ time-frequency domain resource element 520-$m$, where m is an integer that may be greater than, equal to, or less than n.

In some aspects, a network node (e.g., the network node 110) may generate a wireless signal based at least in part on the delay-Doppler domain resource block 504 and modulating a CSI-RS based at least in part on the OTFS modulation scheme. To illustrate, the network node may select one or more CSI-RS delay-Doppler domain resource elements

522 (shown with a diagonal hash pattern) for carrying the (OTFS modulated) CSI-RS. Alternatively or additionally, the network node may generate the wireless signal based at least in part on transmitting an OTFS modulated guard tone based at least in part on one or more guard tone delay-Doppler domain resource elements 524 that are positioned adjacent to the CSI-RS delay-Doppler domain resource elements 522. In some aspects, the network node may use one or more additional delay-Doppler domain resource elements 526 of the delay-Doppler domain resource block 504 (shown with a cross-hatch hash pattern) for OTFS-modulated data. As shown by the example 500, the network node may apply 2D DFT precoding to the wireless signal associated with the delay-Doppler domain resource block 504 (e.g., associated with the CSI-RS, associated with the guard tone, and associated with the modulated data) such that the resource elements of the time-frequency domain resource block 514 include an OTFS modulated signal with precoding that includes any combination of the CSI-RS, data, and/or a guard tone.

As indicated above, FIG. 5 is provided as an example. Other examples may differ from what is described with regard to FIG. 5.

Figure 6:
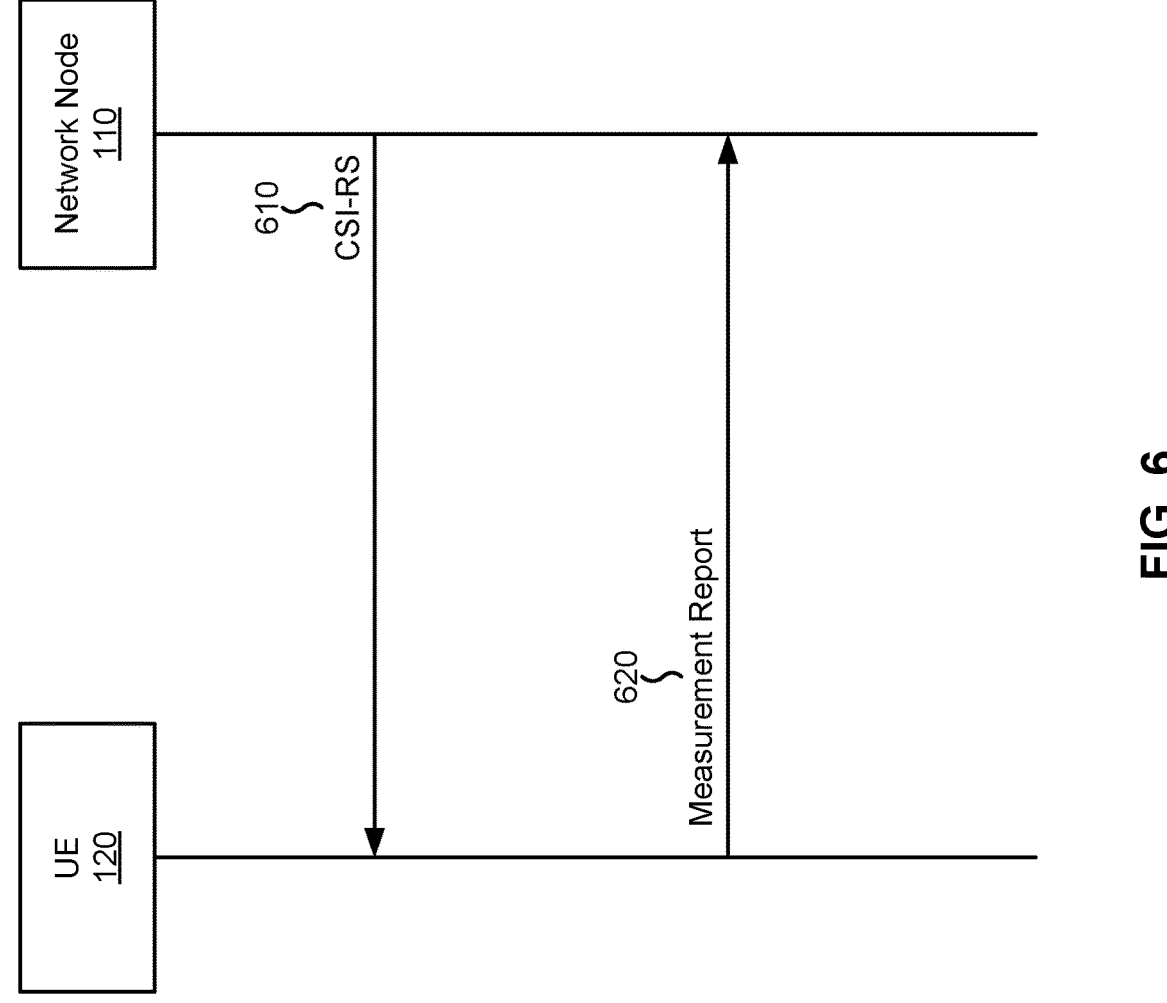
FIG. 6 is a diagram illustrating an example of a wireless communication process between a UE and a network node, in accordance with the present disclosure.

FIG. 6 is a diagram illustrating an example 600 of a wireless communication process between a UE (e.g., the UE 120) and a network node (e.g., the network node 110), in accordance with the present disclosure. As shown by reference number 610, a network node 110 may transmit, and a UE 120 may receive, a wireless signal that includes a CSI-RS. In some aspects, a first portion of the wireless signal may include OTFS modulation and a second portion may exclude the OTFS modulation. To illustrate, the network node may generate the first portion of the wireless signal based at least in part on modulating QAM data using an OTFS modulation scheme. The network node 110 may apply 2D DFT precoding to the OTFS modulated data. Alternatively or additionally, the network node may generate the second portion of the wireless signal based at least in part on modulating the CSI-RS using a second modulation scheme, such as an OFDM modulation scheme and/or time-based symbols, and refrain from applying the OTFS modulation to the CSI-RS. The UE 120 may recover the CSI-RS based at least in part on the time-based symbol and the data based at least in part on the OTFS modulation scheme.

In some aspects, the wireless signal may be based at least in part on a resource block that is characterized by a frequency span and a time duration (e.g., a time-frequency domain resource block). The time-frequency domain resource block may be partitioned into multiple resource elements, where each resource element is characterized by a respective frequency span partition of the resource block and a respective time duration partition of the resource block. The network node 110 may transmit, as the second portion of the wireless signal, the CSI-RS using one or more resource elements. For example, the network node 110 may generate and transmit the CSI-RS based at least in part on using one or more time-frequency domain resource elements as further described with regard to FIGS. 4A-4C.

The UE 120 may recover the CSI-RS from the wireless signal based at least in part on identifying the first modulated portion of the wireless signal associated with the OTFS modulated data and/or the second modulated portion of the wireless signal associated with the CSI-RS. "Recover the CSI-RS" may denote extracting and/or isolating the portion of the wireless signal that carries the CSI-RS. For example, the UE 120 may recover the CSI-RS from the second portion based at least in part on identifying the one or more time-frequency domain resource elements that were used to transmit (by the network node) the second portion of the wireless signal. Alternatively or additionally, the UE 120 may recover the CSI-RS based at least in part on the second modulation scheme (e.g., OFDM) used to modulate the CSI-RS. For example, the UE 120 may recover the CSI-RS based at least in part on an indication of an MCS associated with the CSI-RS. Alternatively or additionally, the UE 120 may recover data from the first modulated portion based at least in part on the OTFS modulation scheme, such as by filtering, extracting, and/or isolating the first portion of the wireless signal from the second portion of the wireless signal, performing a 2D inverse discrete Fourier transform (2D-IDFT) on the first portion of the wireless signal, and demodulating the first portion of the wireless signal based at least in part on the OTFS modulation scheme. Recovering the data based at least in part on the OTFS modulation scheme may include converting the signal from the time-frequency domain to the delay-Doppler domain.

The network node 110 may transmit the first portion of the wireless signal (e.g., including OTFS modulation) using a first partition of the time-frequency domain resource block and the second portion of the wireless signal (e.g., excluding the OTFS modulation) using a second partition of the time-frequency domain resource block. To illustrate, the first partition of the time-frequency domain resource block may be associated with a first time-frequency domain resource element, and the second partition of the time-frequency domain resource block may be associated with a second time-frequency domain resource element, where the first resource element and the second resource element are adjacent to one another. In some aspects, the network node 110 may select one or more delay-Doppler domain resource elements to use for the modulated OTFS data based at least in part on the selected delay-Doppler domain resource elements mapping to the first partition of the time-frequency domain resource block that is adjacent to the second partition of the time-frequency domain resource block, as further described with regard to FIGS. 4A and 4B.

The network node 110 may select the first time-frequency domain resource element and the second time-frequency domain resource element based at least in part on reducing an amount of switching between using OTFS modulation and excluding OTFS modulation. For instance, the network node 110 may select, for the CSI-RS, one or more contiguous and/or adjacent time-frequency domain resource elements that are located at a start of the time-frequency domain resource block or at an end of the resource block to mitigate switching between using OTFS modulation and excluding OTFS modulation in the middle of the time-frequency domain resource block. Alternatively or additionally, the network node 110 may select one or more delay-Doppler domain resource elements that map to one or more contiguous and/or adjacent time-frequency domain resource elements. Minimizing switching between signal portions with different modulation schemes may improve an efficiency of a transmitter by reducing hardware reconfigurations and/or reducing power consumption.

As further described above with regard to FIG. 4C, the network node 110 may transmit the CSI-RS by puncturing the time-frequency domain resource block. To illustrate, the network node 110 may generate a wireless signal that carries OTFS modulated data based at least in part on using delay-Doppler domain resource elements that map and/or convert to an entirety of time-frequency domain resource elements in the time-frequency domain resource block. The network node 110 may puncture portions of the time-frequency domain resource block by replacing one or more time-frequency domain resource elements (e.g., that include the OTFS modulated data) with the CSI-RS (that excludes OTFS modulation). For instance, the network node 110 may puncture the OTFS modulated data in the time-frequency domain. Alternatively or additionally, the UE 120 may recover the CSI-RS based at least in part on the one or more punctured time-frequency domain resource elements.

As further described above with regard to FIG. 5, the network node 110 may modulate the CSI-RS based at least in part on the OTFS modulation scheme and/or one or more delay-Doppler domain resource elements. The network node 110 may apply 2D-DFT precoding to the CSI-RS. Alternatively or additionally, the UE 120 may recover the CSI-RS based at least in part on applying a 2D-IDFT to the received signal and identifying which delay-Doppler resource element(s) carries the CSI-RS. For example, the UE 120 may receive the wireless signal, convert the wireless signal to the delay-Doppler domain, and recover the CSI-RS based at least in part on identifying the one or more delay-Doppler resource elements that carry the CSI-RS.

In some aspects, the network node 110 may transmit the CSI-RS based at least in part on using contiguous delay-Doppler domain resource elements. Alternatively or additionally, the network node 110 may transmit, in one or more additional delay-Doppler domain resource elements, a guard tone. The network node 110 may select, for the guard tone, one or more delay-Doppler domain resource elements that are adjacent to the contiguous delay-Doppler domain resource elements.

The network node 110 may select orthogonal delay-Doppler domain elements to transmit the CSI-RS. To illustrate, the network node 110 may transmit the CSI-RS based at least in part on multiple antenna ports. The network node 110 may select a first set of delay-Doppler domain resource elements for transmitting a first portion of the CSI-RS using a first antenna port and select a second set of delay-Doppler domain resource elements for transmitting a second portion of the CSI-RS using a second antenna port. The network node 110 may select the first set of delay-Doppler domain resource elements and the second set of delay-Doppler domain resource elements such that the first and second sets do not include a common and/or overlapping delay-Doppler domain resource elements. Each set of delay-Doppler domain resource elements may include one or more delay-Doppler resource elements.

As shown by reference number 620, the UE 120 may transmit, and the network node 110 may receive, a measurement report that is based at least in part on the CSI-RS. To illustrate, the UE 120 may generate one or more metrics that estimate a channel quality of the transmission channel between the network node 110 and the UE 120 based at least in part on the recovered CSI-RS. For example, the UE 120 may generate any combination of a precoding matrix indicator (PMI), a rank indicator (RI), RSRQ, RSRP, RSSI, and/or CQI.

Coordinating the transmission of a CSI-RS based at least in part on OTFS modulation may enable a UE to recover the CSI-RS more accurately (e.g., relative to a lack of coordination), and generate a more accurate metric that characterizes the transmission channel between the network node and the UE. A metric with higher accuracy enables the network node to select a transmission configuration (e.g., an MCS) that improves a signal quality at the UE, reduces data recovery errors, improves data throughput, and/or decreases data transfer latencies relative to other transmission configurations.

As indicated above, FIG. 6 is provided as an example. Other examples may differ from what is described with regard to FIG. 6.

FIG. 7 is a diagram illustrating an example process 700 performed, for example, by a mobile station, in accordance with the present disclosure. Example process 700 is an example where the mobile station (e.g., UE 120) performs operations associated with CSI-RS in orthogonal time frequency space.

As shown in FIG. 7, in some aspects, process 700 may include receiving, based at least in part on a time-frequency domain resource block that is characterized at least by a frequency span and a time duration, a wireless signal that includes a first modulated portion located in a first partition of the time-frequency domain resource block, the first modulated portion being based at least in part on an OTFS modulation scheme, and a second modulated portion located in a second partition of the time-frequency domain resource block, the second modulated portion being based at least in part on a second modulation scheme (block 710). For example, the mobile station (e.g., using communication manager 140 and/or reception component 1102, depicted in FIG. 11) may receive, based at least in part on a time-frequency domain resource block that is characterized at least by a frequency span and a time duration, a wireless signal that includes a first modulated portion located in a first partition of the time-frequency domain resource block, the first modulated portion being based at least in part on an OTFS modulation scheme, and a second modulated portion located in a second partition of the time-frequency domain resource block, the second modulated portion being based at least in part on a second modulation scheme, as described above.

As further shown in FIG. 7, in some aspects, process 700 may include recovering a CSI-RS from the first modulated portion or the second modulated portion (block 720). For example, the mobile station (e.g., using communication manager 140 and/or CSI-RS manager component 1108, depicted in FIG. 11) may recover a CSI-RS from the first modulated portion or the second modulated portion, as described above.

Process 700 may include additional aspects, such as any single aspect or any combination of aspects described below and/or in connection with one or more other processes described elsewhere herein.

In a first aspect, the second modulation scheme is an OFDM modulation scheme, and recovering the CSI-RS includes recovering the CSI-RS from the second modulated portion based at least in part on the OFDM modulation scheme.

In a second aspect, alone or in combination with the first aspect, process 700 includes recovering, by the mobile station, data from the first modulated portion based at least in part on the OTFS modulation scheme.

In a third aspect, alone or in combination with one or more of the first and second aspects, recovering the CSI-RS from the second modulated portion includes recovering the CSI-RS from the second modulated portion based at least in part on a time-based symbol associated with the CSI-RS.

In a fourth aspect, alone or in combination with one or more of the first through third aspects, the time-frequency domain resource block includes a plurality of time-frequency domain resource elements, wherein each time-frequency domain resource element of the plurality of time-frequency domain resource elements is characterized by a respective frequency span partition and a respective time duration partition, and wherein recovering the CSI-RS from the second modulated portion includes recovering the CSI-RS based at least in part on at least one time-frequency domain resource element of the plurality of time-frequency domain resource elements.

In a fifth aspect, alone or in combination with one or more of the first through fourth aspects, the at least one time-frequency domain resource element is adjacent to a second time-frequency domain resource element of the plurality of time-frequency domain resource elements that includes at least some of the first modulated portion of the wireless signal.

In a sixth aspect, alone or in combination with one or more of the first through fifth aspects, recovering the CSI-RS based at least in part on the at least one time-frequency domain resource element includes recovering the CSI-RS based at least in part on the at least one time-frequency domain resource element being positioned at a start of the time-frequency domain resource block.

In a seventh aspect, alone or in combination with one or more of the first through sixth aspects, recovering the CSI-RS based at least in part on the at least one time-frequency domain resource element includes recovering the CSI-RS based at least in part on the at least one time-frequency domain resource element being positioned at an end of the time-frequency domain resource block.

In an eighth aspect, alone or in combination with one or more of the first through seventh aspects, the plurality of time-frequency domain resource elements includes a set of time-frequency domain resource elements including at least some of the first modulated portion of the wireless signal, and recovering the CSI-RS further includes recovering the CSI-RS as a puncture in the plurality of time-frequency domain resource elements that include at least some of the first modulated portion of the wireless signal.

In a ninth aspect, alone or in combination with one or more of the first through eighth aspects, the puncture in the set of time-frequency domain resource elements is a time-frequency domain puncture.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with CSI-RS in orthogonal time frequency space.

As shown in FIG. 8, in some aspects, process 800 may include modulating a first portion of a wireless signal based at least in part on an OTFS modulation scheme, the wireless signal being based at least in part on a time-frequency domain resource block that is characterized by a frequency span and a time duration (block 810). For example, the network node (e.g., using communication manager 150 and/or modulation manager component 1208, depicted in FIG. 12) may modulate a first portion of a wireless signal based at least in part on an OTFS modulation scheme, the wireless signal being based at least in part on a time-frequency domain resource block that is characterized by a frequency span and a time duration, as described above.

As further shown in FIG. 8, in some aspects, process 800 may include modulating a second portion of the wireless signal based at least in part on a second modulation scheme, the second portion of the wireless signal including a CSI-RS (block 820). For example, the network node (e.g., using communication manager 150 and/or modulation manager component 1208, depicted in FIG. 12) may modulate a second portion of the wireless signal based at least in part on a second modulation scheme, the second portion of the wireless signal including a CSI-RS, as described above.

As further shown in FIG. 8, in some aspects, process 800 may include transmitting the first portion of the wireless signal based at least in part on a first partition of the time-frequency domain resource block, and the second portion of the wireless signal based at least in part on a second partition of the time-frequency domain resource block (block 830). For example, the network node (e.g., using communication manager 150 and/or transmission component 1204, depicted in FIG. 12) may transmit the first portion of the wireless signal based at least in part on a first partition of the time-frequency domain resource block, and the second portion of the wireless signal based at least in part on a second partition of the time-frequency domain resource block, as described above.

Process 800 may include additional aspects, such as any single aspect or any combination of aspects described below and/or in connection with one or more other processes described elsewhere herein.

In a first aspect, the second modulation scheme is an OFDM modulation scheme, and modulating the second portion includes modulating the CSI-RS based at least in part on the OFDM modulation scheme.

In a second aspect, alone or in combination with the first aspect, process 800 includes modulating, as the first portion of the wireless signal, data based at least in part on the OTFS modulation scheme.

In a third aspect, alone or in combination with one or more of the first and second aspects, modulating the data based at least in part on the OTFS modulation scheme further includes applying precoding to the data based at least in part on a two-dimensional discrete Fourier transform.

In a fourth aspect, alone or in combination with one or more of the first through third aspects, process 800 includes puncturing, by the network node, the data in a time-frequency domain with the CSI-RS.

In a fifth aspect, alone or in combination with one or more of the first through fourth aspects, puncturing the data in the time-frequency domain includes replacing at least a portion of the data with a portion of the CSI-RS.

In a sixth aspect, alone or in combination with one or more of the first through fifth aspects, modulating the CSI-RS includes modulating the CSI-RS based at least in part on a time-based symbol associated with the CSI-RS.

In a seventh aspect, alone or in combination with one or more of the first through sixth aspects, the time-frequency domain resource block includes a plurality of time-frequency domain resource elements, wherein each time-frequency domain resource element of the plurality of time-frequency domain resource elements is characterized by a respective frequency span partition and a respective time duration partition, and wherein transmitting the wireless signal includes transmitting, as at least part of the second portion of the wireless signal, the CSI-RS based at least in part on at least one time-frequency domain resource element of the plurality of time-frequency domain resource elements.

In an eighth aspect, alone or in combination with one or more of the first through seventh aspects, the at least one time-frequency domain resource element is adjacent to a second time-frequency domain resource element of the plurality of time-frequency domain resource elements that includes at least some of the first portion of the wireless signal.

In a ninth aspect, alone or in combination with one or more of the first through eighth aspects, transmitting the CSI-RS based at least in part on the at least one time-frequency domain resource element includes transmitting the CSI-RS based at least in part on the at least one time-frequency domain resource element being positioned at a start of the time-frequency domain resource block.

In a tenth aspect, alone or in combination with one or more of the first through ninth aspects, transmitting the CSI-RS based at least in part on the at least one time-frequency domain resource element includes transmitting the CSI-RS based at least in part on the at least one time-frequency domain resource element being positioned at an end of the time-frequency domain resource block.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a mobile station, in accordance with the present disclosure. Example process 900 is an example where the mobile station (e.g., UE 120) performs operations associated CSI-RS in orthogonal time frequency space.

As shown in FIG. 9, in some aspects, process 900 may include receiving a wireless signal that includes a CSI-RS transmitted based at least in part on at least one delay-Doppler domain resource element that is characterized by a Doppler frequency partition and a delay partition (block 910). For example, the mobile station (e.g., using communication manager 140 and/or reception component 1102, depicted in FIG. 11) may receive a wireless signal that includes a CSI-RS transmitted based at least in part on at least one delay-Doppler domain resource element that is characterized by a Doppler frequency partition and a delay partition, as described above.

As further shown in FIG. 9, in some aspects, process 900 may include recovering the CSI-RS based at least in part on an OTFS modulation scheme and the at least one delay-Doppler domain resource element (block 920). For example, the mobile station (e.g., using communication manager 140 and/or CSI-RS manager component 1108, depicted in FIG. 11) may recover the CSI-RS based at least in part on an OTFS modulation scheme and the at least one delay-Doppler domain resource element, as described above.

Process 900 may include additional aspects, such as any single aspect or any combination of aspects described below and/or in connection with one or more other processes described elsewhere herein.

In a first aspect, the wireless signal includes a delay-Doppler domain resource block that is characterized at least by a delay span and a Doppler span, wherein the delay-Doppler domain resource block includes a plurality of delay-Doppler domain resource elements, each delay-Doppler domain resource element of the plurality of delay-Doppler domain resource elements being based at least in part on the delay span and the Doppler span, and wherein the at least one delay-Doppler domain resource element is included in the plurality of delay-Doppler domain resource elements.

In a second aspect, alone or in combination with the first aspect, process 900 includes recovering, by the mobile station, data from the wireless signal based at least in part on the OTFS modulation scheme and a portion of the delay-Doppler domain resource block.

In a third aspect, alone or in combination with one or more of the first and second aspects, at least a second delay-Doppler domain resource element of the plurality of delay-Doppler domain resource elements includes the CSI-RS.

In a fourth aspect, alone or in combination with one or more of the first through third aspects, the at least one delay-Doppler domain resource element that includes the CSI-RS is at least a first delay-Doppler domain resource element, wherein at least a second delay-Doppler domain resource element of the plurality of delay-Doppler domain resource elements is configured as a guard tone, and wherein the at least first delay-Doppler domain resource element is adjacent to the at least second delay-Doppler domain resource element.

In a fifth aspect, alone or in combination with one or more of the first through fourth aspects, process 900 includes generating a metric that indicates a channel quality based at least in part on recovering the CSI-RS.

In a sixth aspect, alone or in combination with one or more of the first through fifth aspects, the CSI-RS is associated with at least two ports, and the least one delay-Doppler domain resource element includes at least two orthogonal delay-Doppler domain resource elements.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a network node, in accordance with the present disclosure. Example process 1000 is an example where the network node (e.g., network node 110) performs operations associated with CSI-RS in orthogonal time frequency space.

As shown in FIG. 10, in some aspects, process 1000 may include modulating a CSI-RS based at least in part on an OTFS modulation scheme (block 1010). For example, the network node (e.g., using communication manager 150 and/or modulation manager component 1208, depicted in FIG. 12) may modulate a CSI-RS based at least in part on an OTFS modulation scheme, as described above.

As further shown in FIG. 10, in some aspects, process 1000 may include transmitting a wireless signal that includes the CSI-RS based at least in part on including the CSI-RS in at least one delay-Doppler domain resource element characterized at least by a Doppler partition and a delay partition (block 1020). For example, the network node (e.g., using communication manager 150 and/or transmission component 1204, depicted in FIG. 12) may transmit a wireless signal that includes the CSI-RS based at least in part on including the CSI-RS in at least one delay-Doppler domain resource element characterized at least by a Doppler partition and a delay partition, as described above.

Process 1000 may include additional aspects, such as any single aspect or any combination of aspects described below and/or in connection with one or more other processes described elsewhere herein.

In a first aspect, the wireless signal includes a delay-Doppler domain resource block that is characterized at least by a delay span and a Doppler span, wherein the delay-Doppler domain resource block includes a plurality of delay-Doppler domain resource elements, each delay-Doppler domain resource element of the plurality of delay-Doppler domain resource elements being based at least in part on the delay span and the Doppler span, and wherein the at least one delay-Doppler domain resource is included in the plurality of delay-Doppler domain resource elements.

In a second aspect, alone or in combination with the first aspect, at least two contiguous delay-Doppler domain resource elements of the plurality of delay-Doppler domain resource elements include the CSI-RS.

In a third aspect, alone or in combination with one or more of the first and second aspects, the at least one delay-Doppler domain resource element that includes the CSI-RS is at least a first delay-Doppler domain resource element, wherein at least a second delay-Doppler domain resource element of the plurality of delay-Doppler domain resource elements is configured as a guard tone, and wherein the at least first delay-Doppler domain resource element is adjacent to the at least second delay-Doppler domain resource element.

In a fourth aspect, alone or in combination with one or more of the first through third aspects, the CSI-RS is associated with at least two ports, wherein the least one delay-Doppler domain resource element includes at least two orthogonal delay-Doppler domain resource elements, and wherein transmitting the wireless signal includes transmitting the wireless signal using the at least two ports.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
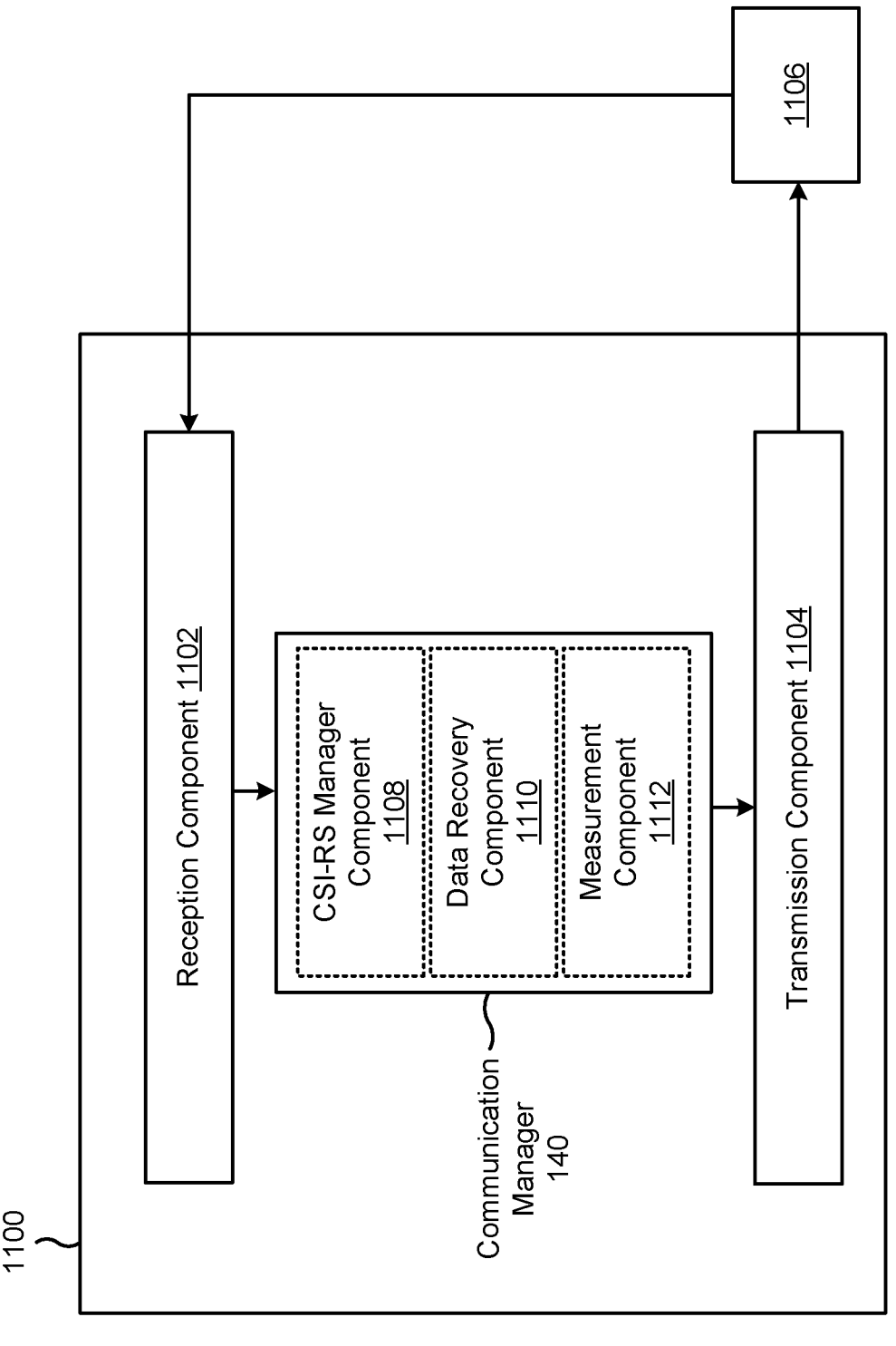
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a mobile station, or a mobile station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140) may include one or more of a CSI-RS manager component 1108, a data recovery component 1110, or a measurement component 1112, among other examples.

In some aspects, the apparatus 1100 may be configured to perform one or more operations described herein in connection with FIGS. 4A-6. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the mobile station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the mobile station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the mobile station described in connection with FIG. 2. In some aspects, the transmission component 1104 may be co-located with the reception component 1102 in a transceiver.

The reception component 1102 may receive, based at least in part on a time-frequency domain resource block that is characterized at least by a frequency span and a time duration, a wireless signal that includes a first modulated portion located in a first partition of the time-frequency domain resource block, the first modulated portion being based at least in part on OTFS modulation scheme, and a second modulated portion located in a second partition of the time-frequency domain resource block, the second modulated portion being based at least in part on a second modulation scheme. The CSI-RS manager component 1108 may recover a CSI-RS from the first modulated portion or the second modulated portion.

The data recovery component 1110 may recover data from the wireless signal based at least in part on the OTFS modulation scheme and a portion of the delay-Doppler domain resource block. In some aspects, the data recovery component 1110 may recover data from the first modulated portion based at least in part on the OTFS modulation scheme.

The reception component 1102 may receive a wireless signal that includes CSI-RS transmitted based at least in part on at least one delay-Doppler domain resource element that is characterized by a Doppler frequency partition and a delay partition. The CSI-RS manager component 1108 may recover the CSI-RS based at least in part on an OTFS modulation scheme and the at least one delay-Doppler domain resource element.

The measurement component 1112 may generate a metric that indicates a channel quality based at least in part on recovering the CSI-RS.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
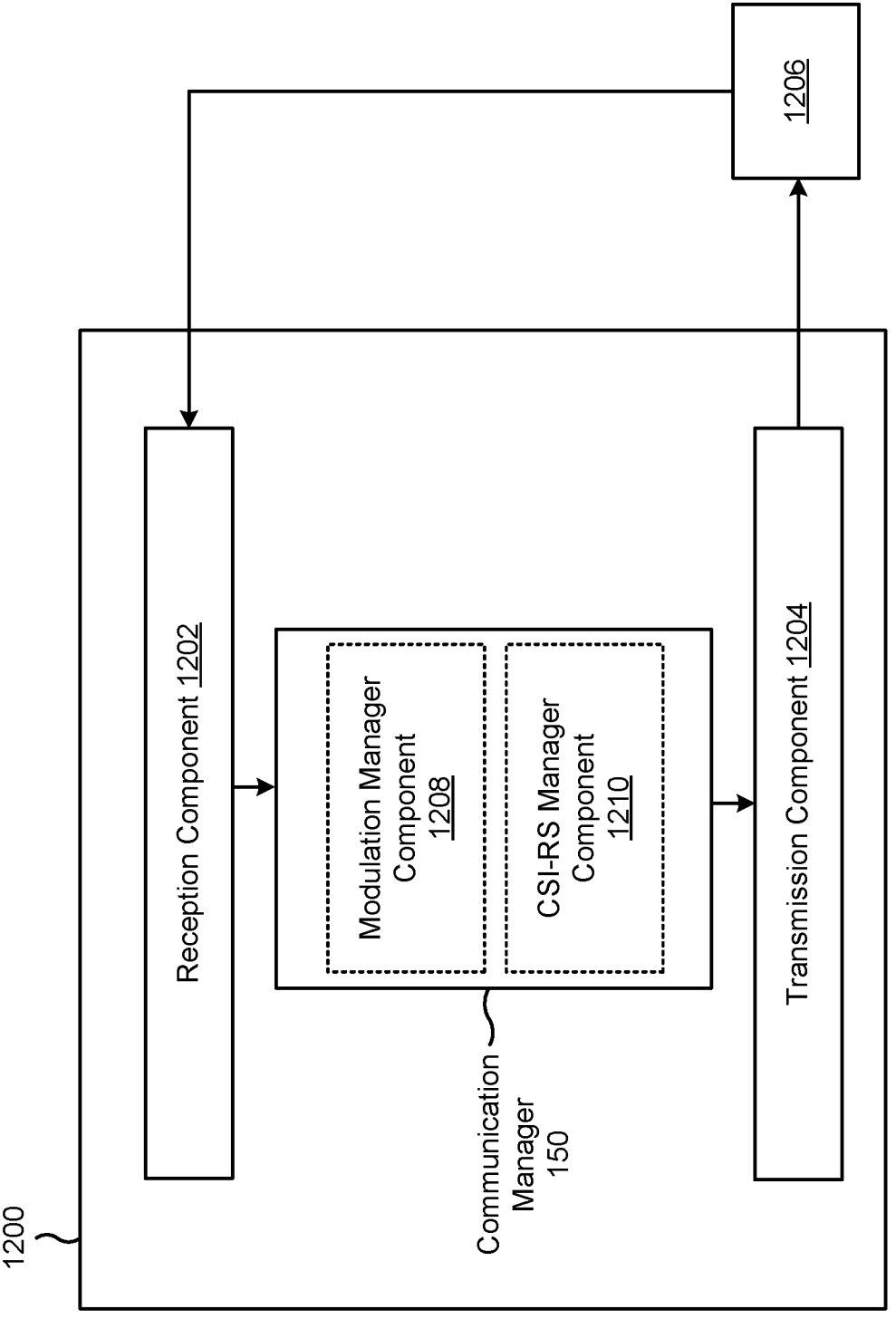
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of a modulation manager component 1208, and/or a CSI-RS manager component 1210, among other examples.

In some aspects, the apparatus 1200 may be configured to perform one or more operations described herein in connection with FIGS. 4A-6. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The modulation manager component 1208 may modulate a first portion of a wireless signal based at least in part on an OTFS modulation scheme, the wireless signal being based at least in part on a time-frequency domain resource block that is characterized by a frequency span and a time duration. The modulation manager component 1208 may modulate a second portion of the wireless signal based at least in part on a second modulation scheme, the second portion of the wireless signal including a CSI-RS. The transmission component 1204 may transmit the first portion of the wireless signal based at least in part on a first partition of the time-frequency domain resource block, and the second portion of the wireless signal based at least in part on a second partition of the time-frequency domain resource block.

The modulation manager component 1208 may modulate, as the first portion of the wireless signal, data based at least in part on the OTFS modulation scheme.

The CSI-RS manager component 1210 may puncture the data in a time-frequency domain with the CSI-RS.

The modulation manager component 1208 may modulate a CSI-RS based at least in part on an OTFS modulation scheme. The transmission component 1204 may transmit a wireless signal that includes the CSI-RS based at least in part on including the CSI-RS in at least one delay-Doppler domain resource element characterized at least by a Doppler partition and a delay partition.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a mobile station, comprising: receiving, by the mobile station and based at least in part on a time-frequency domain resource block that is characterized at least by a frequency span and a time duration, a wireless signal that includes: a first modulated portion located in a first partition of the time-frequency domain resource block, the first modulated portion being based at least in part on an orthogonal time frequency space (OTFS) modulation scheme, and a second modulated portion located in a second partition of the time-frequency domain resource block, the second modulated portion being based at least in part on a second modulation scheme; and recovering, by the mobile station, a channel state information reference signal (CSI-RS) from the first modulated portion or the second modulated portion.

Aspect 2: The method of Aspect 1, wherein the second modulation scheme is an orthogonal frequency-division multiplexing (OFDM) modulation scheme, and wherein recovering the CSI-RS comprises: recovering the CSI-RS from the second modulated portion based at least in part on the OFDM modulation scheme.

Aspect 3: The method of Aspect 2, further comprising: recovering, by the mobile station, data from the first modulated portion based at least in part on the OTFS modulation scheme.

Aspect 4: The method of Aspect 2 or Aspect 3, wherein recovering the CSI-RS from the second modulated portion comprises: recovering the CSI-RS from the second modulated portion based at least in part on a time-based symbol associated with the CSI-RS.

Aspect 5: The method of any one of Aspects 2-4, wherein the time-frequency domain resource block comprises a plurality of time-frequency domain resource elements, wherein each time-frequency domain resource element of the plurality of time-frequency domain resource elements is characterized by a respective frequency span partition and a respective time duration partition, and wherein recovering the CSI-RS from the second modulated portion comprises: recovering the CSI-RS based at least in part on at least one time-frequency domain resource element of the plurality of time-frequency domain resource elements.

Aspect 6: The method of Aspect 5, wherein the at least one time-frequency domain resource element is adjacent to a second time-frequency domain resource element of the plurality of time-frequency domain resource elements that includes at least some of the first modulated portion of the wireless signal.

Aspect 7: The method of Aspect 5 or Aspect 6, wherein recovering the CSI-RS based at least in part on the at least one time-frequency domain resource element comprises: recovering the CSI-RS based at least in part on the at least one time-frequency domain resource element being positioned at a start of the time-frequency domain resource block.

Aspect 8: The method of Aspect 5 or Aspect 6, wherein recovering the CSI-RS based at least in part on the at least one time-frequency domain resource element comprises: recovering the CSI-RS based at least in part on the at least one time-frequency domain resource element being positioned at an end of the time-frequency domain resource block.

Aspect 9: The method of Aspect 5, wherein the plurality of time-frequency domain resource elements comprises a set of time-frequency domain resource elements including at least some of the first modulated portion of the wireless signal, and wherein recovering the CSI-RS further comprises: recovering the CSI-RS as a puncture in the plurality of time-frequency domain resource elements that include at least some of the first modulated portion of the wireless signal.

Aspect 10: The method of Aspect 9, wherein the puncture in the set of time-frequency domain resource elements is a time-frequency domain puncture.

Aspect 11: A method of wireless communication performed by a network node, comprising: modulating, by the network node, a first portion of a wireless signal based at least in part on an orthogonal time frequency space (OTFS) modulation scheme, the wireless signal being based at least in part on a time-frequency domain resource block that is characterized by a frequency span and a time duration; modulating, by the network node, a second portion of the wireless signal based at least in part on a second modulation scheme, the second portion of the wireless signal including a channel state information reference signal (CSI-RS); and transmitting, by the network node, the first portion of the wireless signal based at least in part on a first partition of the time-frequency domain resource block, and the second portion of the wireless signal based at least in part on a second partition of the time-frequency domain resource block.

Aspect 12: The method of Aspect 11, wherein the second modulation scheme is an orthogonal frequency-division multiplexing (OFDM) modulation scheme, and wherein modulating the second portion comprises: modulating the CSI-RS based at least in part on the OFDM modulation scheme.

Aspect 13: The method of Aspect 12, further comprising: modulating, as the first portion of the wireless signal, data based at least in part on the OTFS modulation scheme.

Aspect 14: The method of Aspect 13, wherein modulating the data based at least in part on the OTFS modulation scheme further comprises: applying, by the network node, precoding to the data based at least in part on a two-dimensional discrete Fourier transform.

Aspect 15: The method of Aspect 13, further comprising: puncturing, by the network node, the data in a time-frequency domain with the CSI-RS.

Aspect 16: The method of Aspect 15, wherein puncturing the data in the time-frequency domain comprises: replacing at least a portion of the data with a portion of the CSI-RS.

Aspect 17: The method of any one of Aspects 12-16, wherein modulating the CSI-RS comprises: modulating the CSI-RS based at least in part on a time-based symbol associated with the CSI-RS.

Aspect 18: The method of any one of Aspects 12-17, wherein the time-frequency domain resource block comprises a plurality of time-frequency domain resource elements, wherein each time-frequency domain resource element of the plurality of time-frequency domain resource elements is characterized by a respective frequency span partition and a respective time duration partition, and wherein transmitting the wireless signal comprises: transmitting, as at least part of the second portion of the wireless signal, the CSI-RS based at least in part on at least one time-frequency domain resource element of the plurality of time-frequency domain resource elements.

Aspect 19: The method of Aspect 18, wherein the at least one time-frequency domain resource element is adjacent to a second time-frequency domain resource element of the plurality of time-frequency domain resource elements that includes at least some of the first portion of the wireless signal.

Aspect 20: The method of Aspect 18, wherein transmitting the CSI-RS based at least in part on the at least one time-frequency domain resource element comprises: transmitting the CSI-RS based at least in part on the at least one time-frequency domain resource element being positioned at a start of the time-frequency domain resource block.

Aspect 21: The method of Aspect 18, wherein transmitting the CSI-RS based at least in part on the at least one time-frequency domain resource element comprises: transmitting the CSI-RS based at least in part on the at least one time-frequency domain resource element being positioned at an end of the time-frequency domain resource block.

Aspect 22: A method of wireless communication performed by a mobile station, comprising: receiving, by the mobile station, a wireless signal that includes a channel state information reference signal (CSI-RS) transmitted based at least in part on at least one delay-Doppler domain resource element that is characterized by a Doppler frequency partition and a delay partition; and recovering, by the mobile station, the CSI-RS based at least in part on an orthogonal time frequency space (OTFS) modulation scheme and the at least one delay-Doppler domain resource element.

Aspect 23: The method of Aspect 22, wherein the wireless signal includes a delay-Doppler domain resource block that is characterized at least by a delay span and a Doppler span, wherein the delay-Doppler domain resource block includes a plurality of delay-Doppler domain resource elements, each delay-Doppler domain resource element of the plurality of delay-Doppler domain resource elements being based at least in part on the delay span and the Doppler span, and wherein the at least one delay-Doppler domain resource element is included in the plurality of delay-Doppler domain resource elements.

Aspect 24: The method of Aspect 23, further comprising: recovering, by the mobile station, data from the wireless signal based at least in part on the OTFS modulation scheme and a portion of the delay-Doppler domain resource block.

Aspect 25: The method of Aspect 23 or Aspect 24, wherein at least a second delay-Doppler domain resource element of the plurality of delay-Doppler domain resource elements includes the CSI-RS.

Aspect 26: The method of any one of Aspects 23-25, wherein the at least one delay-Doppler domain resource element that includes the CSI-RS is at least a first delay-Doppler domain resource element, wherein at least a second delay-Doppler domain resource element of the plurality of delay-Doppler domain resource elements is configured as a guard tone, and wherein the at least first delay-Doppler domain resource element is adjacent to the at least second delay-Doppler domain resource element.

Aspect 27: The method of any one of Aspects 22-26, further comprising: generating a metric that indicates a channel quality based at least in part on recovering the CSI-RS.

Aspect 28: The method of any one of Aspects 22-27, wherein the CSI-RS is associated with at least two ports, and wherein the least one delay-Doppler domain resource element comprises at least two orthogonal delay-Doppler domain resource elements.

Aspect 29: A method of wireless communication performed by a network node, comprising: modulating, by the mobile station, a channel state information reference signal (CSI-RS) based at least in part on an orthogonal time frequency space (OTFS) modulation scheme; and transmitting, by the mobile station, a wireless signal that includes the CSI-RS based at least in part on including the CSI-RS in at least one delay-Doppler domain resource element characterized at least by a Doppler partition and a delay partition.

Aspect 30: The method of Aspect 29, wherein the wireless signal includes a delay-Doppler domain resource block that is characterized at least by a delay span and a Doppler span, wherein the delay-Doppler domain resource block includes a plurality of delay-Doppler domain resource elements, each delay-Doppler domain resource element of the plurality of delay-Doppler domain resource elements being based at least in part on the delay span and the Doppler span, and wherein the at least one delay-Doppler domain resource is included in the plurality of delay-Doppler domain resource elements.

Aspect 31: The method of Aspect 30, wherein at least two contiguous delay-Doppler domain resource elements of the plurality of delay-Doppler domain resource elements include the CSI-RS.

Aspect 32: The method of Aspect 30 or Aspect 31, wherein the at least one delay-Doppler domain resource element that includes the CSI-RS is at least a first delay-Doppler domain resource element, wherein at least a second delay-Doppler domain resource element of the plurality of delay-Doppler domain resource elements is configured as a guard tone, and wherein the at least first delay-Doppler domain resource element is adjacent to the at least second delay-Doppler domain resource element.

Aspect 33: The method of any one of Aspects 29-32, wherein the CSI-RS is associated with at least two ports, wherein the least one delay-Doppler domain resource element comprises at least two orthogonal delay-Doppler domain resource elements, and wherein transmitting the wireless signal comprises: transmitting the wireless signal using the at least two ports.

Aspect 34: An apparatus for wireless communication at a device, comprising a processor; memory coupled with the processor; and instructions stored in the memory and executable by the processor to cause the apparatus to perform the method of one or more of Aspects 1-10.

Aspect 35: An apparatus for wireless communication at a device, comprising a processor; memory coupled with the processor; and instructions stored in the memory and executable by the processor to cause the apparatus to perform the method of one or more of Aspects 11-21.

Aspect 36: An apparatus for wireless communication at a device, comprising a processor; memory coupled with the processor; and instructions stored in the memory and executable by the processor to cause the apparatus to perform the method of one or more of Aspects 22-28.

Aspect 37: An apparatus for wireless communication at a device, comprising a processor; memory coupled with the processor; and instructions stored in the memory and executable by the processor to cause the apparatus to perform the method of one or more of Aspects 29-33.

Aspect 38: A device for wireless communication, comprising a memory and one or more processors coupled to the memory, the one or more processors configured to, based at least in part on information stored in the memory, perform the method of one or more of Aspects 1-10.

Aspect 39: A device for wireless communication, comprising a memory and one or more processors coupled to the memory, the one or more processors configured to, based at least in part on the information stored in the memory perform the method of one or more of Aspects 11-21.

Aspect 40: A device for wireless communication, comprising a memory and one or more processors coupled to the memory, the one or more processors configured to, based at least in part on the information stored in the memory, perform the method of one or more of Aspects 22-28.

Aspect 41: A device for wireless communication, comprising a memory and one or more processors coupled to the memory, the one or more processors configured to, based at least in part on the information stored in the memory, perform the method of one or more of Aspects 29-33.

Aspect 42: An apparatus for wireless communication, comprising at least one means for performing the method of one or more of Aspects 1-10.

Aspect 43: An apparatus for wireless communication, comprising at least one means for performing the method of one or more of Aspects 11-21.

Aspect 44: An apparatus for wireless communication, comprising at least one means for performing the method of one or more of Aspects 22-28.

Aspect 45: An apparatus for wireless communication, comprising at least one means for performing the method of one or more of Aspects 29-33.

Aspect 46: A non-transitory computer-readable medium storing code for wireless communication, the code comprising instructions executable by a processor to perform the method of one or more of Aspects 1-10.

Aspect 47: A non-transitory computer-readable medium storing code for wireless communication, the code comprising instructions executable by a processor to perform the method of one or more of Aspects 11-21.

Aspect 48: A non-transitory computer-readable medium storing code for wireless communication, the code comprising instructions executable by a processor to perform the method of one or more of Aspects 22-28.

Aspect 49: A non-transitory computer-readable medium storing code for wireless communication, the code comprising instructions executable by a processor to perform the method of one or more of Aspects 29-33.

Aspect 50: A non-transitory computer-readable medium storing a set of instructions for wireless communication, the set of instructions comprising one or more instructions that, when executed by one or more processors of a device, cause the device to perform the method of one or more of Aspects 1-10.

Aspect 51: A non-transitory computer-readable medium storing a set of instructions for wireless communication, the set of instructions comprising one or more instructions that, when executed by one or more processors of a device, cause the device to perform the method of one or more of Aspects 11-21.

Aspect 52: A non-transitory computer-readable medium storing a set of instructions for wireless communication, the set of instructions comprising one or more instructions that, when executed by one or more processors of a device, cause the device to perform the method of one or more of Aspects 22-28.

Aspect 53: A non-transitory computer-readable medium storing a set of instructions for wireless communication, the set of instructions comprising one or more instructions that, when executed by one or more processors of a device, cause the device to perform the method of one or more of Aspects 29-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:

one or more memories; and one or more processors configured to, based at least in part on information stored in the one or more memories:

receive, based at least in part on a time-frequency domain resource block that is characterized at least by a frequency span and a time duration and comprising a plurality of time-frequency domain resource elements, a wireless signal, wherein each time-frequency domain resource element of the plurality of time-frequency domain resource elements is characterized by a respective frequency span partition and a respective time duration partition, the wireless signal including:

a first modulated portion located in a first partition of the time-frequency domain resource block, the first partition including a first set of resource elements of the plurality of time-frequency domain resource elements, and the first modulated portion being based at least in part on an orthogonal time frequency space (OTFS) modulation scheme, and a second modulated portion located in a second partition of the time-frequency domain resource block, the second partition including a second set of resource elements of the plurality of time-frequency domain resource elements, and the second modulated portion being based at least in part on a second modulation scheme; and recover a channel state information reference signal (CSI-RS) from the second modulated portion based at least in part on at least one time-frequency domain resource element of the plurality of time-frequency domain resource elements, wherein:

the at least one time-frequency domain resource element is adjacent to a second time-frequency domain resource element of the plurality of time-frequency domain resource elements that includes at least some of the first modulated portion of the wireless signal, or the one or more processors, to recover the CSI-RS, are configured to, based at least in part on information stored in the one or more memories, recover the CSI-RS as a puncture in set of time-frequency domain resource elements of the plurality of time-frequency domain resource elements that include at least some of the first modulated portion of the wireless signal.

2. The apparatus of claim 1, wherein the second modulation scheme is an orthogonal frequency-division multiplexing (OFDM) modulation scheme, and wherein the one or more processors, to recover the CSI-RS, are configured to:

recover the CSI-RS from the second modulated portion based at least in part on the OFDM modulation scheme.

3. The apparatus of claim 2, wherein the one or more processors, to recover the CSI-RS based at least in part on the at least one time-frequency domain resource element, are configured to, based at least in part on the information stored in the one or more memories:

recover the CSI-RS based at least in part on the at least one time-frequency domain resource element being positioned at a start of the time-frequency domain resource block.

4. The apparatus of claim 2, wherein the puncture in the set of time-frequency domain resource elements is a time-frequency domain puncture.

5. The apparatus of claim 1, wherein the one or more processors, based at least in part on the information stored in the one or more memories, are further configured to:

recover data from the first modulated portion based at least in part on the OTFS modulation scheme.

6. The apparatus of claim 1, wherein the one or more processors, to recover the CSI-RS from the second modulated portion, are configured to, based at least in part on the information stored in the one or more memories:

recover the CSI-RS from the second modulated portion based at least in part on a time-based symbol associated with the CSI-RS.

7. An apparatus for wireless communication at a network node, comprising:

one or more memories; and one or more processors configured to, based at least in part on information stored in the one or more memories:

modulate, as a first portion of a wireless signal, data based at least in part on an orthogonal time frequency space (OTFS) modulation scheme, the wireless signal being based at least in part on a time-frequency domain resource block that is characterized by a frequency span and a time duration and comprising a plurality of time-frequency domain resource elements;

modulate a second portion of the wireless signal based at least in part on a second modulation scheme, the second portion of the wireless signal including a channel state information reference signal (CSI-RS); and transmit the first portion of the wireless signal based at least in part on a first partition of the time-frequency domain resource block, and the second portion of the wireless signal based at least in part on a second partition of the time-frequency domain resource block, the first partition including a first set of resource elements of the plurality of time-frequency domain resource elements, and the second partition including a second set of resource elements of the plurality of time-frequency domain resource elements, wherein:

at least one time-frequency domain resource element of the plurality of time-frequency domain resource elements is adjacent to a second time-frequency domain resource element of the plurality of time-frequency domain resource elements that includes at least some of the first portion of the wireless signal, or the one or more processors are further configured to, based at least in part on information stored in the one or more memories, puncture the data in a time-frequency domain with the CSI-RS.

8. The apparatus of claim 7, wherein the second modulation scheme is an orthogonal frequency-division multiplexing (OFDM) modulation scheme, and wherein the one or more processors, to modulate the second portion, are configured to, based at least in part on the information stored in the one or more memories:

modulate the CSI-RS based at least in part on the OFDM modulation scheme.

9. The apparatus of claim 7, wherein the one or more processors, to modulate the data based at least in part on the OTFS modulation scheme, are configured to, based at least in part on the information stored in the one or more memories:

apply precoding to the data based at least in part on a two-dimensional discrete Fourier transform.

10. The apparatus of claim 7, wherein the one or more processors, to puncture the data in the time-frequency domain, are configured to, based at least in part on the information stored in the one or more memories:

replace at least a portion of the data with a portion of the CSI-RS.

11. The apparatus of claim 7, wherein the one or more processors, to modulate the CSI-RS, are configured to, based at least in part on the information stored in the one or more memories:

modulate the CSI-RS based at least in part on a time-based symbol associated with the CSI-RS.

12. The apparatus of claim 7, wherein each time-frequency domain resource element of the plurality of time-frequency domain resource elements is characterized by a respective frequency span partition and a respective time duration partition, and wherein the one or more processors, to transmit the wireless signal, are configured to, based at least in part on the information stored in the one or more memories:

transmit, as at least part of the second portion of the wireless signal, the CSI-RS based at least in part on at least one time-frequency domain resource element of the plurality of time-frequency domain resource elements.

13. The apparatus of claim 7, wherein the one or more processors, to transmit the CSI-RS based at least in part on the at least one time-frequency domain resource element, are configured to, based at least in part on the information stored in the one or more memories:

transmit the CSI-RS based at least in part on the at least one time-frequency domain resource element being positioned at an end of the time-frequency domain resource block.

14. A method for wireless communication at a mobile station, comprising:

receiving, based at least in part on a time-frequency domain resource block that is characterized at least by a frequency span and a time duration and comprising a plurality of time-frequency domain resource elements, a wireless signal, wherein each time-frequency domain resource element of the plurality of time-frequency domain resource elements is characterized by a respective frequency span partition and a respective time duration partition, the wireless signal including:

a first modulated portion located in a first partition of the time-frequency domain resource block, the first partition including a first set of resource elements of the plurality of time-frequency domain resource elements, and the first modulated portion being based at least in part on an orthogonal time frequency space (OTFS) modulation scheme, and a second modulated portion located in a second partition of the time-frequency domain resource block, the second partition including a second set of resource elements of the plurality of time-frequency domain resource elements, and the second modulated portion being based at least in part on a second modulation scheme; and recovering a channel state information reference signal (CSI-RS) from the second modulated portion based at least in part on at least one time-frequency domain resource element of the plurality of time-frequency domain resource elements, wherein:

the at least one time-frequency domain resource element is adjacent to a second time-frequency domain resource element of the plurality of time-frequency domain resource elements that includes at least some of the first modulated portion of the wireless signal, or recovering the CSI-RS comprises recovering the CSI-RS as a puncture in set of time-frequency domain resource elements of the plurality of time-frequency domain resource elements that include at least some of the first modulated portion of the wireless signal.

15. The method of claim 14, wherein the second modulation scheme is an orthogonal frequency-division multiplexing (OFDM) modulation scheme, and wherein recovering the CSI-RS comprises:

recovering the CSI-RS from the second modulated portion based at least in part on the OFDM modulation scheme.

16. The method of claim 14, further comprising:

recovering data from the first modulated portion based at least in part on the OTFS modulation scheme.

17. The method of claim 14, wherein recovering the CSI-RS from the second modulated portion comprises:

recovering the CSI-RS from the second modulated portion based at least in part on a time-based symbol associated with the CSI-RS.

18. The method of claim 14, wherein recovering the CSI-RS based at least in part on the at least one time-frequency domain resource element comprises:

recovering the CSI-RS based at least in part on the at least one time-frequency domain resource element being positioned at a start of the time-frequency domain resource block.

19. The method of claim 14, wherein the puncture in the set of time-frequency domain resource elements is a time-frequency domain puncture.

20. A method for wireless communication at a network node, comprising:

modulating, as a first portion of a wireless signal, data based at least in part on an orthogonal time frequency space (OTFS) modulation scheme, the wireless signal being based at least in part on a time-frequency domain resource block that is characterized by a frequency span and a time duration and comprising a plurality of time-frequency domain resource elements;

modulating a second portion of the wireless signal based at least in part on a second modulation scheme, the second portion of the wireless signal including a channel state information reference signal (CSI-RS); and transmitting the first portion of the wireless signal based at least in part on a first partition of the time-frequency domain resource block, and the second portion of the wireless signal based at least in part on a second partition of the time-frequency domain resource block, the first partition including a first set of resource elements of the plurality of time-frequency domain resource elements, and the second partition including a second set of resource elements of the plurality of time-frequency domain resource elements, wherein:

at least one time-frequency domain resource element of the plurality of time-frequency domain resource elements is adjacent to a second time-frequency domain resource element of the plurality of time-frequency domain resource elements that includes at least some of the first portion of the wireless signal, or the method further comprises puncturing the data in a time-frequency domain with the CSI-RS.

21. The method of claim 20, wherein the second modulation scheme is an orthogonal frequency-division multiplexing (OFDM) modulation scheme, and wherein modulating the second portion comprises:

modulating the CSI-RS based at least in part on the OFDM modulation scheme.

22. The method of claim 20, wherein modulating the CSI-RS comprises:

modulating the CSI-RS based at least in part on a time-based symbol associated with the CSI-RS.

23. The method of claim 20, wherein each time-frequency domain resource element of the plurality of time-frequency domain resource elements is characterized by a respective frequency span partition and a respective time duration partition, and wherein transmitting the wireless signal comprises:

transmitting, as at least part of the second portion of the wireless signal, the CSI-RS based at least in part on at least one time-frequency domain resource element of the plurality of time-frequency domain resource elements.

24. The method of claim 20, further comprising:

applying precoding to the data based at least in part on a two-dimensional discrete Fourier transform.

25. The method of claim 20, further comprising:

replacing at least a portion of the data with a portion of the CSI-RS.

26. The method of claim 20, wherein transmitting the CSI-RS based at least in part on the at least one time-frequency domain resource element comprises:

transmitting the CSI-RS based at least in part on the at least one time-frequency domain resource element being positioned at an end of the time-frequency domain resource block.

* * * * *